(12) United States Patent
Morita et al.

(10) Patent No.: US 11,831,840 B2
(45) Date of Patent: Nov. 28, 2023

(54) INFORMATION PROCESSING APPARATUS, IMAGE READING APPARATUS AND IMAGE PROCESSING SYSTEM TO OUTPUT INFORMATION RELATING TO SETTING INFORMATION FOR EACH OF A PLURALITY OF APPLICATIONS

(71) Applicant: PFU LIMITED, Kahoku (JP)

(72) Inventors: Yuki Morita, Kahoku (JP); Sosuke Takeshita, Kahoku (JP); Kaho Onoue, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/807,009

(22) Filed: Jun. 15, 2022

(65) Prior Publication Data

US 2023/0058711 A1 Feb. 23, 2023

(30) Foreign Application Priority Data

Aug. 20, 2021 (JP) .................................. 2021-134734

(51) Int. Cl.
*H04N 1/40* (2006.01)
*G06F 18/214* (2023.01)

(52) U.S. Cl.
CPC ....... *H04N 1/40056* (2013.01); *G06F 18/214* (2023.01)

(58) Field of Classification Search
CPC .. G06F 3/04817; G06F 3/0482; G06F 3/1297; G06N 20/00; G06N 20/10; G06N 3/045; G06N 3/048; G06N 3/08; H04N 1/00416; H04N 1/00758; H04N 1/04

USPC ........................................................ 358/1.15
See application file for complete search history.

(56) References Cited

U.S. PATENT DOCUMENTS

| | | | |
|---|---|---|---|
| 9,361,135 B2 * | 6/2016 | Doi | G06F 9/445 |
| 9,396,084 B2 * | 7/2016 | Hyo | H04N 1/00832 |
| 11,673,759 B2 * | 6/2023 | Nakanishi | B65H 31/20 |
| | | | 271/207 |
| 11,714,339 B2 * | 8/2023 | Maeda | G03B 17/561 |
| | | | 348/374 |

(Continued)

FOREIGN PATENT DOCUMENTS

| | | |
|---|---|---|
| JP | 2020-17839 A | 1/2020 |
| JP | 2020-107272 A | 7/2020 |

*Primary Examiner* — Negussie Worku
(74) *Attorney, Agent, or Firm* — LEWIS ROCA ROTHGERBER CHRISTIE LLP

(57) ABSTRACT

An information processing apparatus includes a storage device to store, for a plurality of sample media, for each of a plurality of applications, setting information relating to imaging of a medium or an image processing, and image information relating to a sample image generated according to the setting information, a communication device, and a processor to receive an input image from an image reading apparatus via the communication device, extract a predetermined number of sample media in a descending order of a similarity between a corresponding sample image and the input image, from among the plurality of sample media, based on the image information, identify the setting information for each of the plurality of applications for each of the extracted predetermined number of sample media, and output the identified setting information for each of the plurality of applications.

9 Claims, 16 Drawing Sheets

(56) References Cited

U.S. PATENT DOCUMENTS

| | | | |
|---|---|---|---|
| 11,755,519 B2* | 9/2023 | Maeda | G06F 13/385 |
| | | | 710/313 |
| 2011/0154251 A1* | 6/2011 | Kano | G09G 5/14 |
| | | | 715/800 |
| 2013/0019209 A1* | 1/2013 | Ishikawa | H04N 23/80 |
| | | | 715/838 |
| 2013/0339942 A1* | 12/2013 | Brunsman | G06F 8/61 |
| | | | 717/173 |
| 2018/0164964 A1* | 6/2018 | Hori | G06T 11/60 |
| 2019/0386873 A1* | 12/2019 | Wakabayashi | H04L 41/5003 |
| 2020/0034007 A1 | 1/2020 | Kawano et al. | |
| 2021/0112169 A1* | 4/2021 | Sakaguchi | H04N 1/00411 |
| 2021/0389712 A1* | 12/2021 | Ueda | G03G 15/5029 |

* cited by examiner

FIG. 3

| USER ID | SAMPLE MEDIUM ID | APPLICATION | SETTING INFORMATION | SAMPLE IMAGE | IMAGE INFORMATION | ... |
|---|---|---|---|---|---|---|
| U001 | M001 | FOR MAIL | N111 | P1111, P1112,... | Q111 | ... |
| | | FOR SAVING | N112 | P1121, P1122,... | Q112 | ... |
| | | FOR BUSINESS MEETING | N113 | P1131, P1132,... | Q113 | ... |
| | | ... | ... | ... | ... | ... |
| | M002 | FOR MAIL | N121 | P1211, P1212,... | Q121 | ... |
| | | FOR SAVING | N122 | P1221, P1222,... | Q122 | ... |
| | | FOR BUSINESS MEETING | N123 | P1231, P1232,... | Q123 | ... |
| | | ... | ... | ... | ... | ... |
| | ... | ... | ... | ... | ... | ... |
| U002 | M021 | FOR MAIL | N211 | P2111, P2112,... | Q211 | ... |
| | | FOR SAVING | N212 | P2121, P2122,... | Q212 | ... |
| | | FOR BUSINESS MEETING | N213 | P2131, P2132,... | Q213 | ... |
| | | ... | ... | ... | ... | ... |
| | M022 | FOR MAIL | N221 | P2211, P2212,... | Q221 | ... |
| | | FOR SAVING | N222 | P2221, P2222,... | Q222 | ... |
| | | FOR BUSINESS MEETING | N223 | P2231, P2232,... | Q223 | ... |
| | | ... | ... | ... | ... | ... |
| | ... | ... | ... | ... | ... | ... |
| ... | ... | ... | ... | ... | ... | ... |

FIG. 4

| ITEM | SETTING INFORMATION (APPLICATION) | | | |
|---|---|---|---|---|
| | N111 (FOR MAIL) | N112 (FOR SAVING) | N113 (FOR BUSINESS MEETING) | ... |
| RESOLUTION | 600dpi | 200dpi | 300dpi | ... |
| COLOR | COLOR | COLOR | BINARY VALUE | ... |
| INCLINATION CORRECTION | ON | ON | OFF | ... |
| BACKGROUND PATTERN REMOVAL | OFF | OFF | ON | ... |
| DROPOUT COLOR | OFF | OFF | ON (RED) | ... |
| COMPRESSION | OFF | ON(5) | OFF | ... |
| FORMAT | PDF | JPEG | PDF | ... |
| MULTI-FEED DETECTION | ON | OFF | OFF | ... |
| ... | ... | ... | ... | ... |

INFORMATION PROCESSING APPARATUS, IMAGE READING APPARATUS AND IMAGE PROCESSING SYSTEM TO OUTPUT INFORMATION RELATING TO SETTING INFORMATION FOR EACH OF A PLURALITY OF APPLICATIONS

CROSS-REFERENCE TO RELATED APPLICATIONS

This application is based upon and claims the benefit of priority of prior Japanese Patent Application No. 2021-134734, filed on Aug. 20, 2021, the entire contents of which are incorporated herein by reference.

TECHNICAL FIELD

Embodiments discussed in the present specification relate to setting relating to imaging of a medium or an image processing.

BACKGROUND

Recently, an image reading apparatus, such as a scanner, to generate an image by imaging a medium, is utilized for imaging various types of media in various applications. A quality of the image required for the image reading apparatus varies according to the application or the type of the medium to be read, etc. In general, the image reading apparatus has a variety of settings relating to imaging of the medium or image processing, such as a resolution, a color or a correction, so as to generate an appropriate image according to the application or the type of the medium, etc. However, it is not easy for the user to select the appropriate setting according to the application or the type of the medium from among various settings.

A scanning system for deriving a setting corresponding to an image read by a preview scan, based on a learning result machine-learned by teacher data in which setting of a process involving scanning is associated with a scanned image, is disclosed (see Japanese Unexamined Patent Publication No, 2020-17839). The scanning system executes the process involving scanning based on the derived setting.

A server for estimating candidates of a form type of an input form, based on learning data in which a type of the form is learned using image data of the form, is disclosed (refer to Japanese Unexamined Patent Publication No. 2020-107272). This server identifies a type of an image of the input form by comparing a feature amount of image data of the form of the form type acquired by estimation with a feature amount of the image of the input form

SUMMARY

According to some embodiments, an information processing apparatus includes a storage device to store, for a plurality of sample media, for each of a plurality of applications, setting information relating to imaging of a medium or an image processing, and image information relating to a sample image generated according to the setting information, a communication device, and a processor to receive an input image from an image reading apparatus via the communication device, extract a predetermined number of sample media in a descending order of a similarity between a corresponding sample image and the input image, from among the plurality of sample media, based on the image information, identify the setting information for each of the plurality of applications for each of the extracted predetermined number of sample media, and output the identified setting information for each of the plurality of applications.

According to some embodiments, an image reading apparatus includes a storage device to store, for a plurality of sample media, for each of a plurality of applications, setting information relating to imaging of a medium or an image processing, and image information relating to a sample image generated according to the setting information, an imaging device to generate an input image by imaging a medium, and a processor to extract a predetermined number of sample media in a descending order of a similarity between a corresponding sample image and the input image, from among the plurality of sample media, based on the image information, identify the setting information for each of the plurality of applications for each of the extracted predetermined number of sample media, and output information relating to the identified setting information for each of the plurality of applications.

According to some embodiments, an image processing system includes an information processing apparatus and an image reading apparatus. The information processing apparatus includes a storage device to store, for a plurality of sample media, for each of a plurality of applications, setting information relating to imaging of a medium or an image processing, and image information relating to a sample image generated according to the setting information, a first communication device, and a first processor to receive an input image from the image reading apparatus via the first communication device, extract a predetermined number of sample media in a descending order of a similarity between a corresponding sample image and the input image, from among the plurality of sample media, based on the image information, identify the setting information for each of the plurality of applications for each of the extracted predetermined number of sample media, and transmit the identified setting information for each of the plurality of applications to the image reading apparatus via the first communication device. The image reading apparatus includes an imaging device to generate the input image by imaging a medium, a second communication device, and a second processor to transmit the input image to the information processing apparatus via the second communication device, receive the setting information for each of the plurality of applications from the information processing apparatus via the second communication device, and output information relating to the received setting information for each of the plurality of applications.

BRIEF DESCRIPTION OF DRAWINGS

FIG. 3 is a diagram illustrating an example of a data structure of a setting table.

FIG. 4 is a diagram illustrating an example of a data structure of a detail table.

DESCRIPTION OF EMBODIMENTS

It is to be understood that both the foregoing general description and the following detailed description are exemplary and explanatory, and are not restrictive of the invention, as claimed.

Hereinafter, an information processing apparatus, an image reading apparatus, an image processing system, a control method and a control program according to an embodiment, will be described with reference to the drawings. However, it should be noted that the technical scope of the invention is not limited to these embodiments, and extends to the inventions described in the claims and their equivalents.

Figure 1:
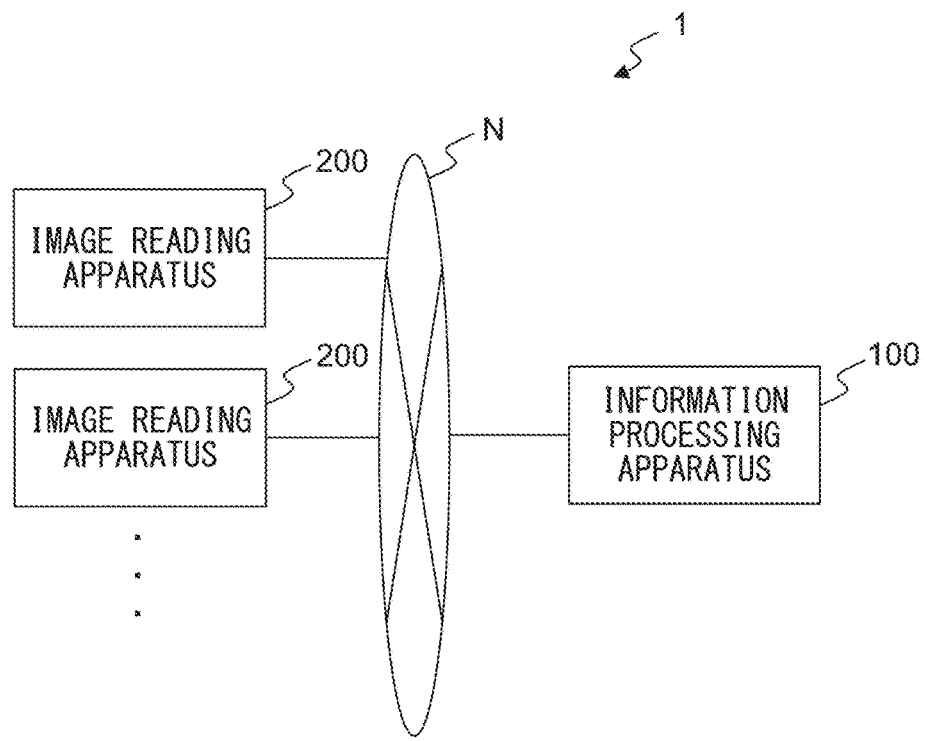
FIG. 1 is a configuration diagram of an example of an image processing system 1 according to the embodiment.

FIG. 1 is a configuration diagram of an example of an image processing system 1 according to the embodiment.

The image processing system 1 includes an information processing apparatus 100 and one or more image reading apparatuses 200. The information processing apparatus 100 and the image reading apparatus 200 communicate with each other via a network N. The information processing apparatus 100 is, for example, a server provided in a cloud network. The information processing apparatus 100 may be a personal computer, a notebook-type personal computer, a tablet-type computer, a smartphone, etc. The image reading apparatus 200 is an image scanner, etc., to convey and image a medium being a document. The media may be paper, thin paper, cardboard, card, or the like. The image reading apparatus 200 may be a facsimile, a copying machine, a printer multifunction machine (MFP, Multifunction Peripheral), etc. The image reading apparatus 200 may be a flatbed type image scanner, facsimile, copying machine, MFP, etc., to image a medium without conveying. The image reading apparatus 200 may be a mobile phone, a smartphone, a tablet-type computer, a notebook-type personal computer, etc., to image a person, an object or a landscape, etc. The Network N is internet, intranet, etc.

Figure 2:
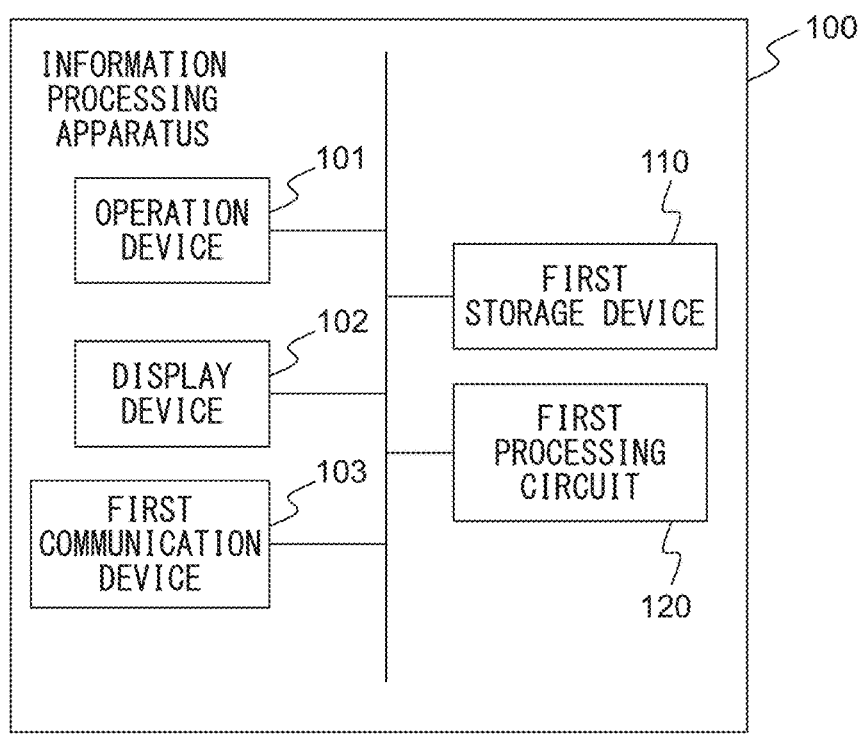
FIG. 2 is a block diagram illustrating a schematic configuration of an information processing apparatus 100.

FIG. 2 is a block diagram illustrating a schematic configuration of the information processing apparatus 100.

The information processing apparatus 100 includes an operation device 101, a display device 102, a first communication device 103, a first storage device 110, a first processing circuit 120, etc.

The operation device 101 includes an input device and an interface circuit for acquiring a signal from the input device, receives an operation by a user, and outputs a signal corresponding to the input by the user to the first processing circuit 120.

The display device 102 includes a display constituted of a liquid crystal, an organic electro-luminescence (EL), etc., and an interface circuit for outputting image data to the display, to display image data on the display in accordance with an instruction from the first processing circuit 120. A display device and an operation device may be integrally provided using a touch panel type input device.

The first communication device 103 is an example of a communication device or a first communication device. The first communication device 103 includes a wired communication interface circuit according to a communication protocol such as TCP/IP (Transmission Control Protocol/ internet Protocol). The first communication device 103 is communicative with the image reading apparatus 200, and communicates with the image reading apparatus 200 to transmit and receive various types of images and information. The first communication device 103 may include an antenna for transmitting and receiving a wireless signal and a wireless communication interface circuit for transmitting and receiving signals through a wireless communication line in accordance with a predetermined wireless communication protocol, and communicate with the image reading apparatus 200. The predetermined wireless communication protocol is, for example, a wireless LAN (Local Area Network).

The first storage device 110 is an example of a storage device, and includes a memory device such as a random access memory (RAM) or a read only memory (ROM), a fixed disk device such as a hard disk, or a portable storage device such as an optical disk. The first storage device 110 stores computer programs, databases, tables, etc., used for various kinds of processing of the information processing apparatus 100. The computer program may be installed on the storage device 301 from a computer-readable, non-transitory medium such as a compact disc read only memory (CD-ROM), a digital versatile disc read only memory (DVD-ROM), or the like by using a well-known setup program etc. The first storage device 110 stores a setting table and a detail table, as data. Details of the setting table and the detail table will be described later.

The first processing circuit 120 operates according to a program stored in advance in the first storage device 110. The processing circuit 170 is, for example, a CPU (Central Processing Unit). The first processing circuit 120 may be a digital signal processor (DSP), a large scale integration (LSI), an application specific integrated circuit (ASIC), a field-programmable gate array (FPGA), etc.

The first processing circuit 120 is connected to the operation device 101, the display device 102, the first communication device 103 and the first storage device 110, etc., and controls each of these devices. The first processing circuit 120 controls each device and transmits setting information relating to the imaging of the medium or the image processing, etc., to the image reading apparatus 200.

FIG. 3 is a diagram illustrating an example of a data structure of the setting table.

As shown in FIG. 3, a user ID, a sample medium ID, an application, setting information, a sample image, and image information, etc., are stored in advance in association with each other, in the setting table.

The user ID is identification information uniquely assigned to each user of each image reading apparatus 200. The user IDs of a plurality of users who use each image reading apparatus 200 are registered, as the user ID.

The sample medium ID is identification information assigned to a sample Medium. The sample medium is a medium included in each sample image registered in advance by a system manager, etc., to propose the setting information to the user. A plurality of media of various types are used, as the sample medium. The sample medium is a medium, such as a paper, a thin paper, a cardboard or a card to be imaged by the image reading apparatus 200. The sample medium preferably includes characters, ruled lines, patterns, images, etc., by which features and effects of each setting information are conspicuous in the sample image.

The application is a purpose for the user to utilize the image in which the medium is imaged by the image reading apparatus 200. A plurality of applications of various types are registered as the application. The applications include "for mail" for sending via e-mail, "for saving" for saving as evidence, "for business meeting" for presenting to a client in business meeting, etc.

The setting information is information relating to the imaging of the medium or the image processing, and is information for the image reading apparatus 200 to specify operations when the medium is imaged or contents of the image processing executed to the imaged image. The setting information is included in a profile set for each user in the image reading apparatus 200. Details of the configuration Information will be described later.

The sample image is an image generated by imaging the sample medium and executing the image processing on the imaged image according to the corresponding setting information. For other elements (e.g., paper size, etc.) other than items specified by the setting information, the sample image is generated according to a predetermined default setting. One or more sample images are registered for one set of the sample medium, the application and the setting information. A plurality of sample images may be registered for a set of the sample medium, the application and the setting information.

The linage information is information relating to the corresponding sample image. For example, the image information is a learning model pre-learned by CNN (Convolutional neural network), etc., using the corresponding plurality of sample images. The learning model is, for example, pre-learned so that a high value (e.g., 1) is output when the corresponding sample image is input, and a low value (e.g., 0) is output when an image other than the corresponding sample image is input. Thus, the learning model is pre-learned so that the more likely the input image includes the corresponding sample medium, and the more suitable the input image is for the corresponding application, the higher the output value is.

The image information may be the corresponding sample image itself. The image information may be an image feature amount calculated from the corresponding sample image. The image feature amount is Scale-Invariant Feature Transform (SIFT), Accelerated-KAZE (AKAZE), Oriented FAST and Rotated BRIEF (ORBs), etc.

Thus, the setting table stores, for the plurality of sample media, for each of the plurality of applications, the setting information relating to the imaging of the medium or the image processing, and the image information relating to the sample image generated according to the setting information. Further, the setting table stores the setting information and the image information for each of the plurality of applications for the plurality of sample media, for each of the plurality of user IDs.

FIG. 4 is a diagram illustrating an example of a data structure of the detail table.

As shown in FIG. 4, each setting content for each setting information registered in the setting table are stored in the detail table. The setting information includes, as items, settings relating to a resolution, a color, inclination correction, background pattern removal, a dropout color, compression, a format, or multi-feed detection, etc.

The resolution is a resolution of the generated image. 200 dpi (Dots Per Inch), 300 dpi, 600 dpi, etc., are set as the resolution. The color is a color of the generated image. Binary value, gray scale, color, etc., are set as the color. The inclination correction is a setting for correcting the inclination of the medium included in the generated image using a known image processing technique. ON, OFF, etc., are set as the inclination correction. The background pattern removal is a setting for removing background patterns (continuous patterns such as grids, waves, diagonal lines, characters) included in the background in the generated image using a known image processing technique. ON, OFF, etc., are set as the background pattern removal. The dropout color is a setting for removing a specific color component included in the generated image using a known image processing technique. ON, OFF (a removed color component when ON is set), etc., is set as the dropout color. The image reading apparatus 200 can generate an image in which a color component of the background is removed, for example, by removing the color component from an image in which a medium whose background has a specific color component is imaged.

The compression is a setting for executing image compression such as Joint Photographic Experts Group (JPEG) to the generated image. ON, OFF (a quantization value when ON is set), etc., are set as compression. The format is a file format of the generated image. The format is set to Portable Document Format (PDF), JPEG, etc. The multi-feed detection is a setting for detecting an occurrence of multi-feed of the conveyed medium. ON, OFF, etc., are set as the multi-feed detection.

The resolution is an item relating to the imaging of the medium. The color, the inclination correction, the background pattern removal, the dropout color, the compression and the format are items relating to the image processing. The setting information may include items, such as multi-feed detection, other than those relating to the imaging of the medium or the image processing. The setting information may also include any other item relating to the imaging of the medium or the image processing. Further, the setting information may include any combination of each item. The setting information may include at least one item of each item.

Figure 5:
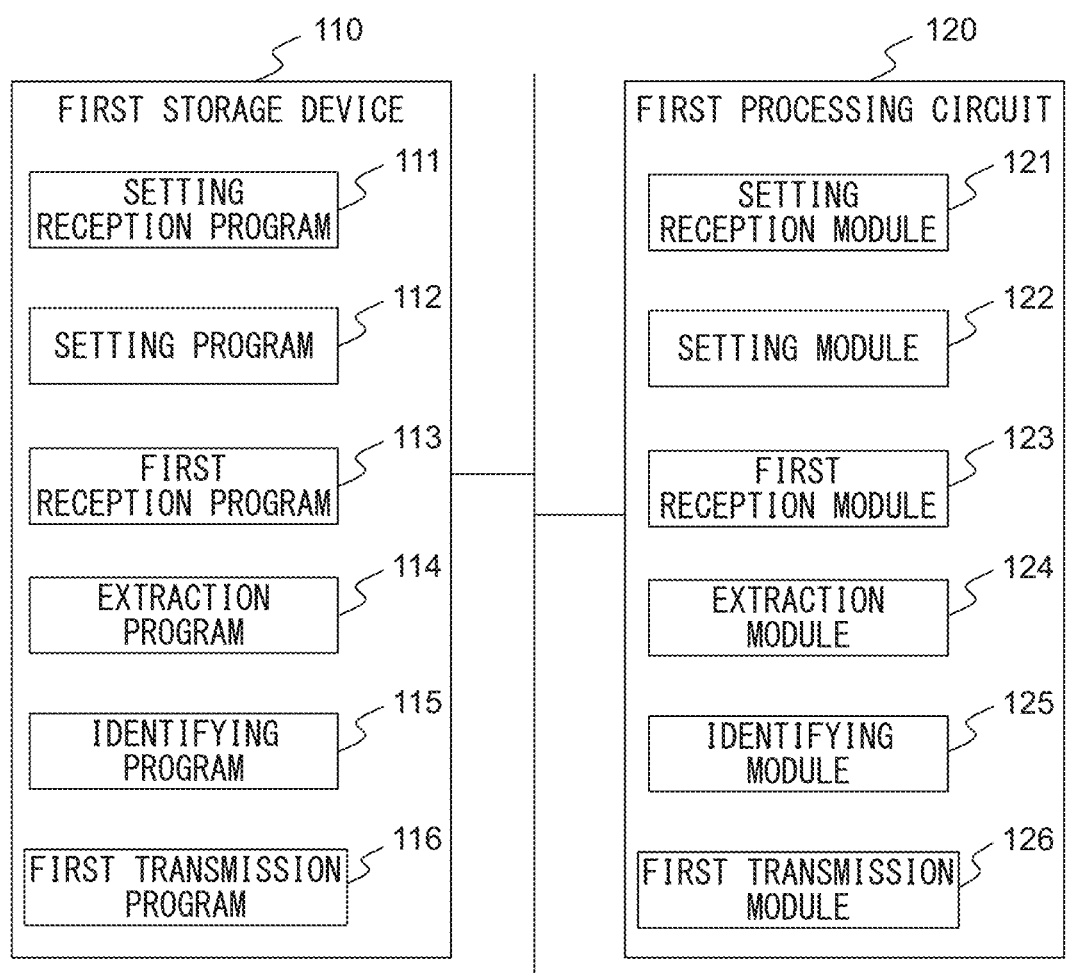
FIG. 5 is a diagram illustrating a schematic configuration of a first storage device 110 and a first processing circuit 120.

FIG. 5 is a diagram illustrating a schematic configuration of the first storage device 110 and the first processing circuit 120 of the information processing apparatus 100.

As shown in FIG. 5, a setting reception program 111, a setting program 112, a first reception program 113, an extraction program 114, an identifying program 115 and a first transmission program 116, etc., are stored in the first storage device 110. Each of these programs is a functional module implemented by software operating on a processor. The first processing circuit 120 reads each program stored in the first storage device 110, and operates according to each of the read programs. Thus, the first processing circuit 120 functions as a setting reception module 121, a setting module 122, a first reception module 123, a extraction module 124, an identifying module 125 and a first transmission module 126. The first reception module 123 is an example of a reception module. The first transmission module 126 is an example of an output control module.

Figure 6:
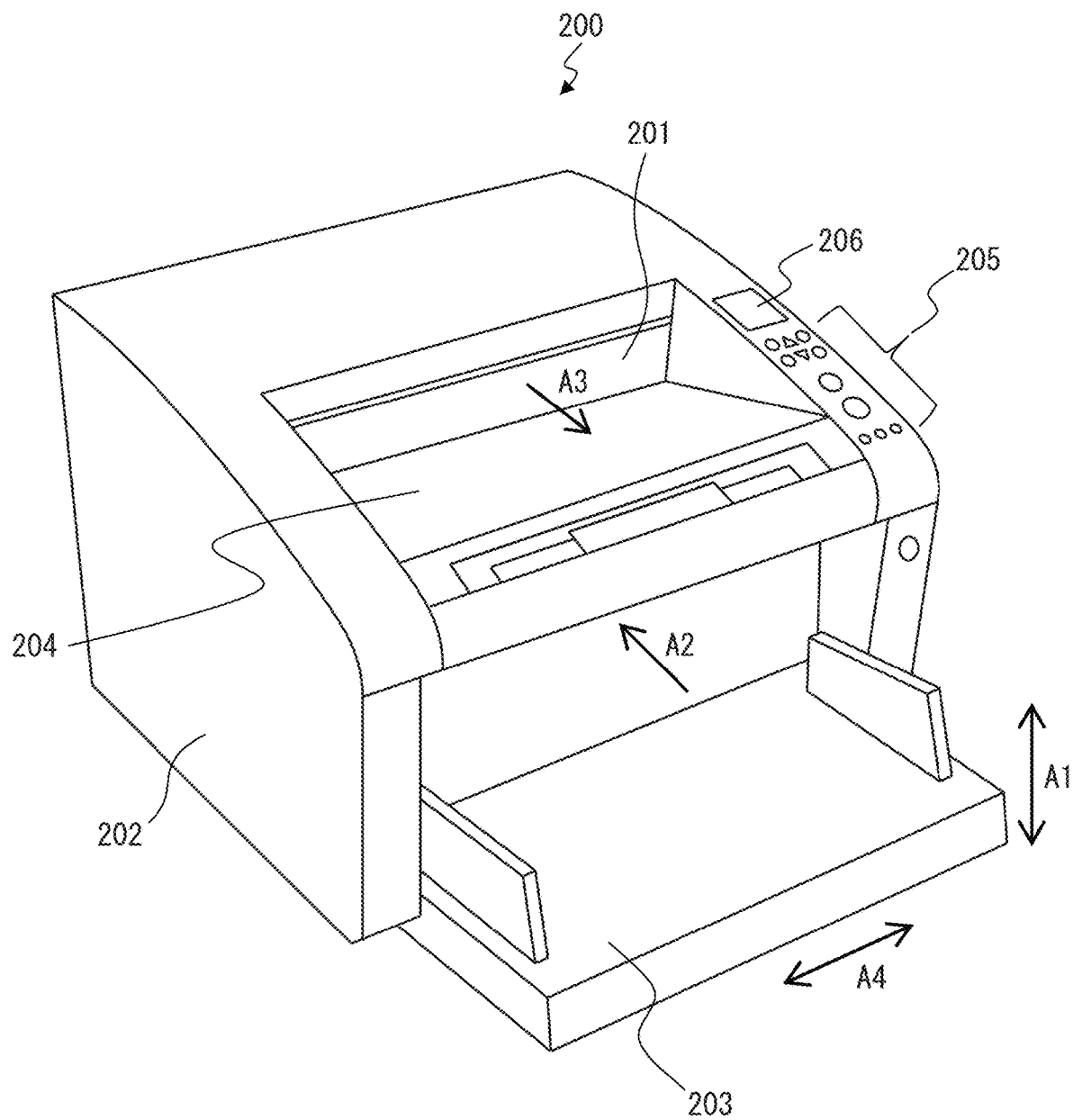
FIG. 6 is a perspective view illustrating an image reading apparatus 200.

FIG. 6 is a perspective view illustrating the image reading apparatus 200 configured as an image scanner.

The image reading apparatus 200 includes a first housing 201, a second housing 202, a medium tray 203, an ejection tray 204, an operation device 205 and a display device 206, etc.

The first housing 201 is located on an upper side of the image reading apparatus 200, and is engaged with the second housing 202 by a hinge so as to be opened or closed at a time of medium jam, during cleaning the inside of the image reading apparatus 100, etc.

The medium tray 203 is engaged with the second housing 202 in such a way as to be able to place a medium to be conveyed. The medium tray 203 is provided on a side surface of the second housing 202 on a medium supply side to be movable in a substantially vertical direction (height direction) A1 by a motor (not shown). The medium tray 203 is located at a position of a lower end to easily place a medium on the medium tray 203 when the medium is not conveyed, and lifts to a position at which the medium placed on the uppermost side is in contact with a pick roller to be described later when the medium is conveyed. The ejection tray 204 is formed on the first housing 201 capable of holding the ejected medium, to load the ejected medium.

The operation device 205 includes an input device such as a button, and an interface circuit acquiring a signal from the input device, receives an input operation by a user, and outputs an operation signal based on the input operation by the user. The display device 206 is an example of a display device. The display device 206 includes a display including a liquid crystal or organic EL, and an interface circuit outputting image data to the display, and displays the image data on the display.

In FIG. 6, an arrow A2 indicates a medium conveying direction, an arrow A3 indicates a medium ejecting direction, and an arrow A4 indicates a width direction perpendicular to the medium conveying direction. Hereinafter, upstream refers to upstream of the medium conveying direction A2 or the medium ejecting direction A3, downstream refers to downstream of the medium conveying direction A2 or the medium ejecting direction A3.

Figure 7:
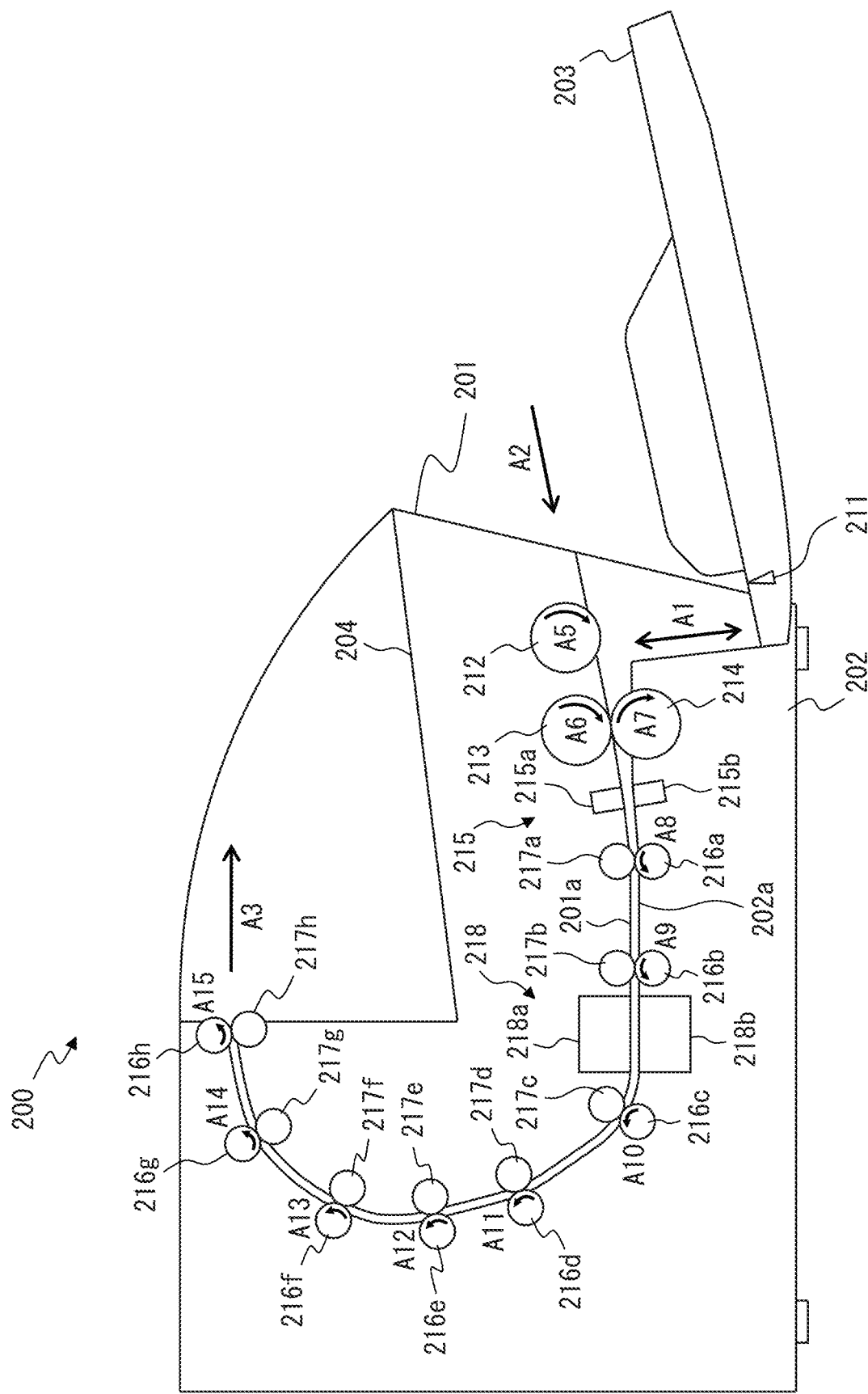
FIG. 7 is a diagram for illustrating a conveyance path inside an image reading apparatus 200.

FIG. 7 is a diagram for illustrating a conveyance path inside an image reading apparatus 200.

The conveyance path inside the image reading apparatus 200 includes a medium sensor 211, a pick roller 212, a feed roller 213, a separation roller 214, an ultrasonic sensor 215, first to eighth conveying rollers 216a to 216h, first to eighth driven rollers 217a to 217h, and an imaging device 218, etc.

The number of each of the pick roller 212, the feed roller 213, the separation roller 214, the first to eighth conveying rollers 216a to 216h and/or the first to eighth driven rollers 217a to 217h is not limited to one, and may be plural. In that case, a plurality of pick rollers 212, feed rollers 213, separation rollers 214, first to eighth conveying rollers 216a to 216h and/or first to eighth driven rollers 217a to 217h are spaced and located along in the width direction A4, respectively.

The surface of the first housing 201 facing the second housing 202 forms a first guide 201a of the medium conveyance path, and the surface of the second housing 202 facing the first housing 201 forms a second guide 202a of the medium conveyance path.

The medium sensor 211 is located on the medium tray 103, i.e., on the upstream side of the feed roller 213 and the separation roller 214, to detect a placing state of the medium in the medium tray 203. The medium sensor 211 determines whether or not the medium is placed on the medium tray 203, by a contact detection sensor to pass a predetermined current when a medium is in contact or a medium is not in contact. The medium sensor 211 generates and outputs a medium signal whose signal value changes in a state where the medium is placed on the medium tray 203 and a state where it is not placed. The medium sensor 211 is not limited to the contact detection sensor, any other sensor, such as a light detection sensor, capable of detecting the presence or absence of the medium may be used as the medium sensor 211.

The pick roller 212 is provided in the first housing 201, and comes into contact with the medium placed on the medium tray 203 lifted to a height substantially equal to that of the medium conveyance path to feed the medium to the downstream side.

The feed roller 213 is located in the first housing 201, and on the downstream side of the pick roller 212, to feed the medium placed on the medium tray 203 and fed by the pick roller 212 toward the further downstream side. The separation roller 214 is located in the second housing 202, to face the feed roller 213. The feed roller 213 and the separate roller 214 perform a medium separation operation to separate the media and feed them one by one.

The ultrasonic sensor 215 is located on the downstream side of the feed roller 213 and on the upstream side of the first conveying roller 216a. The ultrasonic sensor 215 includes an ultrasonic transmitter 215a and an ultrasonic receiver 215b. The ultrasonic transmitter 215a and the ultrasonic receiver 215b are located close to the conveyance path of a medium in such a way as to face one another with the conveyance path in between. The ultrasonic transmitter 215a outputs an ultrasonic wave. On the other hand, the ultrasonic receiver 215b receives an ultrasonic wave being transmitted by the ultrasonic transmitter 215a and passing through a medium, and generates and outputs an ultrasonic signal being an electric signal corresponding to the received ultrasonic wave.

The first to eighth conveying rollers 216a to 216h and the first to eighth driven rollers 217a to 217h are provided on the downstream side of the feed roller 213 and the separation roller 214, to convey the medium fed by the teed roller 213 and the separation roller 214 toward the downstream side. The first to eighth conveying rollers 216a to 216h and the first to eighth driven rollers 217a to 217h are located to face each other with the medium conveyance path in between.

The imaging device 218 is an example of an imaging device, and includes a first imaging device 218a and a second imaging device 218b located to face each other with the medium conveyance path in between. The first imaging device 218a includes a line sensor based on a unity-magnification optical system type contact image sensor (CIS) including an imaging element based on a complementary metal oxide semiconductor (CMOS) linearly located in a main scanning direction. Further, the first imaging device 218a includes a lens for forming an image on the imaging element, and an A/D converter for amplifying and analog-digital (A/D) converting an electric signal output from the imaging element. The first imaging device 218a generates and outputs an input image by imaging a front side of a conveyed medium.

Similarly, the second imaging device 218b includes a line sensor based on a unity-magnification optical system type (IS including an imaging element based on a CMOS linearly located in a main scanning direction. Further, the second imaging device 218b includes a lens for forming an image on the image element, and an A/D converter for amplifying and analog-digital (A/D) converting an electric signal output from the imaging element. The second imaging device 218b generates and outputs an input image by imaging a back side of a conveyed medium.

Only either of the first imaging device 218a and the second imaging device 218b may be located in the image reading apparatus 200 and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs may be used.

The medium placed on the medium tray 203 is conveyed in the medium conveying direction A2 between the first guide 201a and the second guide 202a by the pick roller 212 rotating in a medium feeding direction A5 and the feed roller 213 rotating in a medium feeding direction A6. The separation roller 214 rotates in a direction of the arrow A7, that is, in a direction opposite to the medium feeding direction, when the medium is fed. By the workings of the feed roller 213 and the separation roller 214, when a plurality of media is placed on the medium tray 203, only the media in contact with the feed roller 213, out of the media placed on the medium tray 203, is separated. Consequently, conveyance of a medium other than the separated medium is restricted (prevention of multi-feed)

The medium is fed to an imaging position of the imaging device 218 while being guided by the first guide 201a and the second guide 202a, by the first to second conveyance rollers 216a to 216b rotating in directions of arrows A8 to A9, respectively, and is imaged by the imaging device 218. The medium is ejected on the ejection tray 204 by the third to eighth conveyance rollers 216c to 216h rotating in directions of arrows A10 to A15, respectively.

Figure 8:
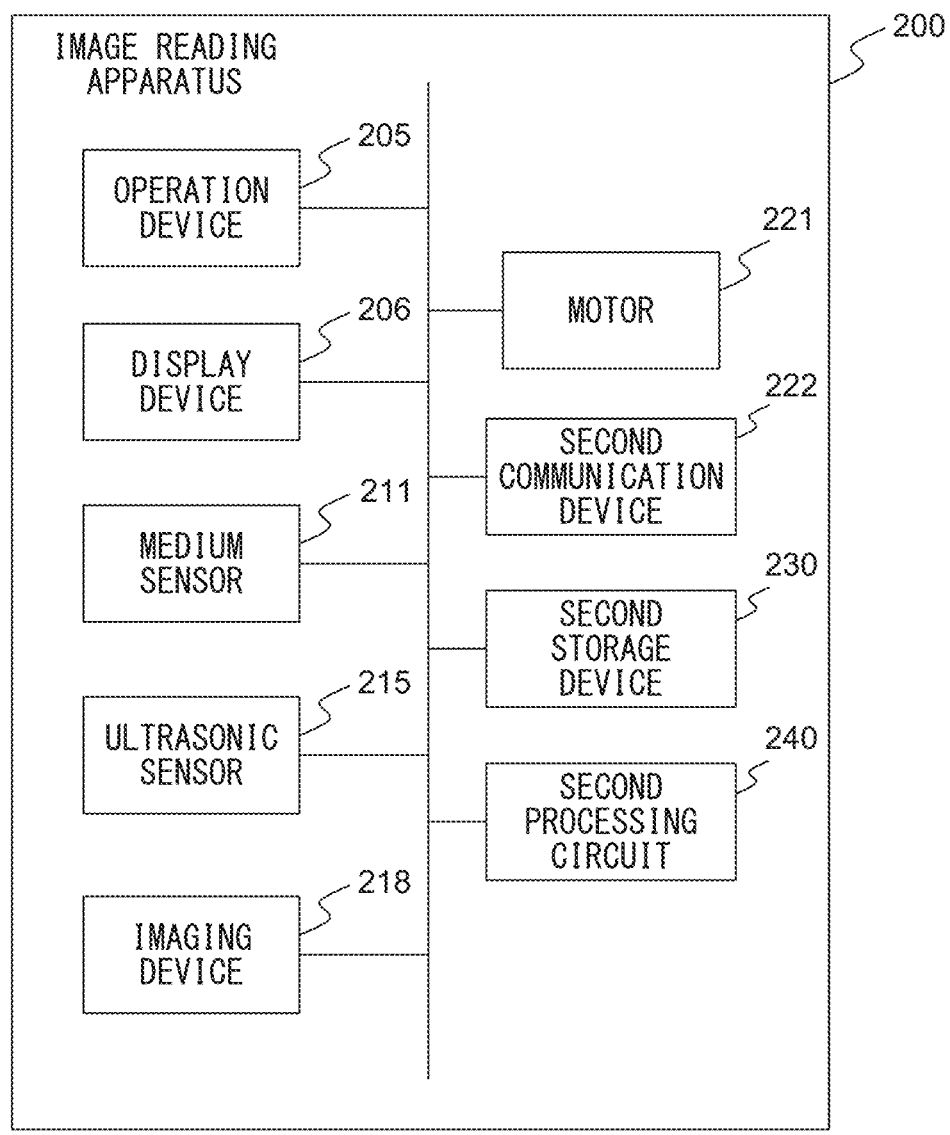
FIG. 8 is a block diagram illustrating a schematic configuration of the image reading apparatus 200.

FIG. 8 is a block diagram illustrating a schematic configuration of the image reading apparatus 200.

The image reading apparatus 200 further includes a motor 221, a second communication device 222, a second storage device 230, a second processing circuit 240, etc., in addition to the configuration described above.

The motor 221 includes one or more motors and rotates the pick roller 212, the feed roller 213, the separation roller 214, and the first to eighth conveying rollers 216a to 216h by a control signal from the second processing circuit 240 to convey the medium. The first to eighth driven rollers 217a to 217h may be provided to rotate by the driving force from the motor rather than to be driven to rotate according to the rotation of each conveyance roller.

The second communication device 222 is an example of the second communication device. The second communication device 222 includes a wired communication interface circuit according to a communication protocol such as TCP/IP. The second communication device 222 is capable of communicating with the information processing apparatus 100, and communicates with the information processing apparatus 100 and a control computer (not shown), to transmit and receive various types of images and information. The second communication device 222 may include an antenna for transmitting and receiving a wireless signal and a wireless communication interface circuit for transmitting and receiving signals through a wireless communication line in accordance with a predetermined wireless communication protocol, and communicate with the information processing apparatus 100. The predetermined wireless communication protocol is, for example, a wireless LAN The second storage device 230 includes a memory device such as a RAM or a ROM, a fixed disk device such as a hard disk, or a portable storage device such as a flexible disk or an optical disk. The second storage device 230 stores computer programs, databases, tables, etc., used for various kinds of processing of the image reading apparatus 200. The computer program may be installed on the second storage device 230 from a computer-readable, non-transitory medium such as a CD-ROM, a DVD-ROM, or the like by using a well-known setup program etc. For example, the portable recording medium is a CD-ROM, a DVD-ROM, or the like.

The second processing circuit 240 operates according to a program stored in advance in the second storage device 230. The second processing circuit 240 is, for example, a CPU. The second processing circuit 240 may be a DSP, an LSI, an ASIC, a FPGA, etc.

The second processing circuit 240 is connected to the operation device 205, the display device 206, the medium sensor 211, the ultrasonic sensor 215, the imaging device 218, the motor 221, the second communication device 222 and the second storage device 230, etc., and controls each of these devices. The second processing circuit 240 performs the control of the operation device 205, the display control of the display device 206, the communication control of the second communication device 222, and the control of the second storage device 230. The second processing circuit 240 performs the drive control of the motor 221 and the imaging control of the imaging device 218, etc., in accordance with the medium signal from the medium sensor 211, acquires the input image, and transmits it to the control computer via the second communication device 222.

Figure 9:
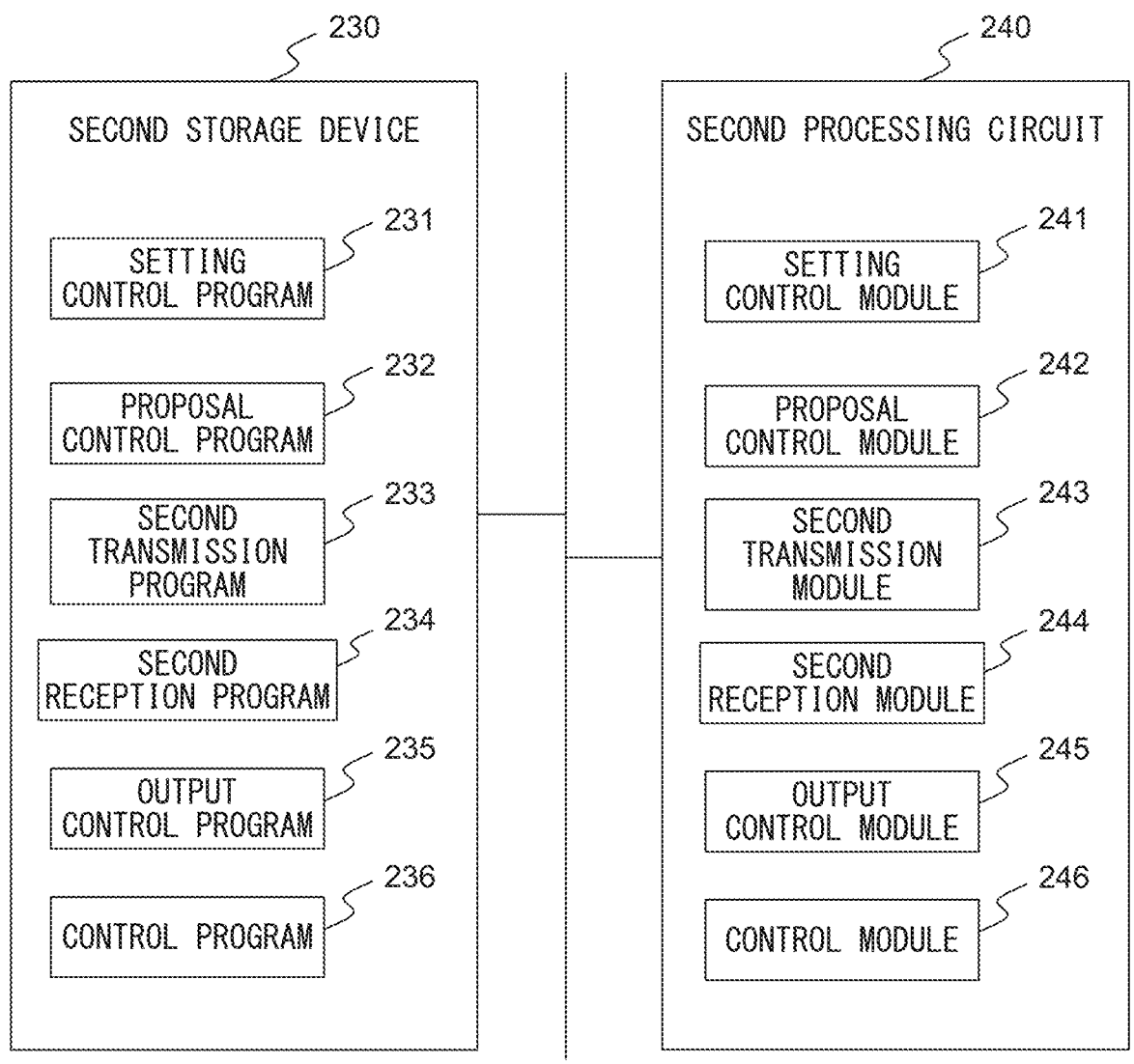
FIG. 9 is a diagram illustrating a schematic configuration of a second storage device 230 and a second processing circuit 240.

FIG. 9 is a diagram illustrating a schematic configuration of the second storage device 230 and the second processing circuit 240.

As shown in FIG. 9, a setting control program 231, a proposal control program 232, a second transmission program 233, a second reception program 234, an output control program 235 and a control program 236, etc., are stored in the second storage device 230. Each of these programs is a functional module implemented by software operating on a processor. The second processing circuit 240 reads each program stored in the second storage device 230 and operates according to each read program. Thus, the second processing circuit 240 functions as a setting control module 241, a proposal control module 242, a second transmission module 243, a second reception module 244, an output control module 245 and a control module 246.

Figure 10:
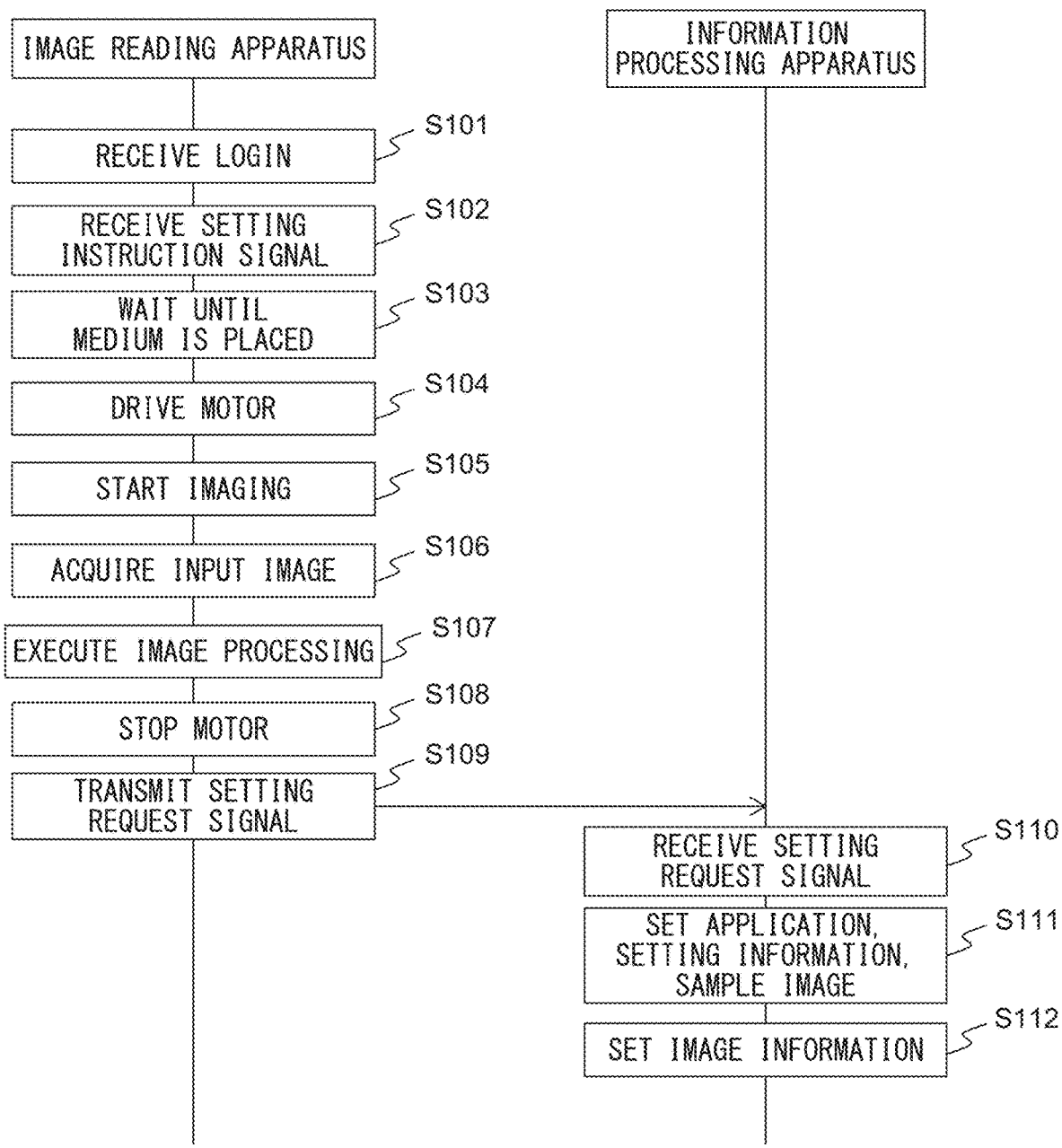
FIG. 10 is an operation sequence illustrating an operation example of a setting process.

FIG. 10 is an operation sequence illustrating an operation example of a setting process by the image processing system 1.

The operation sequence described below is executed mainly by the first processing circuit 120 and the second processing circuit 240 in cooperation with each element in the information processing apparatus 100 and the image reading apparatus 200, in accordance with a program previously stored in the first storage device 110 and the second storage device 230.

First, the setting control module 241 in the image reading apparatus 200 receives a login to the image reading apparatus 200 by a user (step S101). The setting control module 241 receives the login when the user ID is input by the user using the operation device 205. The setting control module 241 may receive the login when an ID card in which the user ID is stored, is held over a card reader (not shown) by the user, and the user ID is read by the card reader. The setting control module 241 may receive an input of a password along with the user ID, and receive the login when a verification (authentication) of the user ID and the password is successful. In this case, the setting control module 241 may request the information processing apparatus 100 to verify the user ID and the password, and receive the login when the verification of the user ID and the password by the information processing apparatus 100 is successful. Further, the setting control module 241 may receive an input of the user ID or a set of the user ID and the password from the control computer via the second communication device 222. Thus, a plurality of users who use the image processing system 1 can log in to each image reading apparatus 200.

Next, the setting control module 241 waits until it receives a setting instruction signal for instructing the setting of the setting information, from the user using the operating device 205, or the control computer via the second communication device 222 (step S102). The setting instruction signal includes the sample medium ID, the application, and the setting information (the setting content for each item) specified by the user using the operation device 205 or the control computer.

Next, the setting control module 241 waits until the medium is placed on the medium tray 203 (step S103). The user places the sample medium on the medium tray 203. The setting control module 241 acquires the medium signal from the medium sensor 211, and determines whether or not the medium is placed on the medium tray 203, based on the acquired medium signal. When the medium is not placed on the medium tray 203, the setting control module 241 may display a notification for prompting the user to place the medium on the medium tray 203 on the display device 206.

Next, the setting control module 241 drives the motor 221 to move the medium tray 203 to a position where the medium and the pick roller 212 abut. The setting control module 241 (hives the motor 221 to rotate the pick roller 212, the feed roller 213, the separation roller 214, and the first to eighth conveying rollers 216a to 216h to convey the medium placed on the medium tray 203 (step S104). The setting control module 241 controls a rotation speed of the motor 221 so that the medium is imaged according to the resolution specified by the setting information included in the setting instruction signal.

Next, the setting control module 241 causes the imaging device 218 to start imaging the medium (step S105). The setting control module 241 controls the imaging device 218 so that the medium is imaged according to the resolution specified by the setting information included in the setting instruction signal.

Next, the setting control module 241 acquires the input image from the imaging device 218, and stops the imaging by the imaging device 218 when the conveyance of the medium is completed (step S106).

Next, the setting control module 241 executes the image processing on the acquired input image, according to the setting content of each item set in the setting information included in the setting instruction signal (step S107).

Next, the setting control module 241 stops the motor 221, to stop the pick roller 212, the feed roller 213, the separation roller 214, and the first to eighth conveying rollers 216a to 216h (step S108).

Next; the setting control module 241 transmits a setting request signal for requesting the setting of the setting information to the information processing apparatus 100 via the second communication device 222 (step S109). The setting request signal includes the user ID acquired in step S101, the sample medium ID, the application and the setting information acquired in step S102, and the input image acquired in step S106 in which the image processing is executed in step S107.

Next, the setting reception module 121 in the information processing apparatus 100 receives the setting request signal from the image reading apparatus 200 via the first communication device 103 (step S110). The setting reception module 121 acquires the user ID, the sample medium ID, the application and the setting information included in the received setting request signal. The setting reception module 121 acquires the input image included in the received setting request signal, as the sample image in which the sample medium is imaged according to the setting information, and which is generated according to the setting information. The setting process in FIG. 10 is executed for multiple applications for a plurality of sample media of various types. That is, the setting reception module 121 receives the setting information and the sample image for each of the plurality of applications for the plurality of sample media from the image reading apparatus 200 via the first communication device 103, Further, the setting reception module 121 receives the setting information and the sample image for each of the plurality of applications for the plurality of sample media, for each of the plurality of user IDs.

Next, the setting module 122 sets the user ID; the sample medium ID, the application, the setting information and the sample image received by the setting reception module 121 in the setting table in association with each other, and sets the setting information in the detailed table (step S111).

Next, the setting module 122 generates the image information from the sample image received by the setting reception module 121 and sets it the image information in the setting table in association with the user ID, the sample medium ID, the application; the setting information and the sample image (step S112). When the image information is the learning model, the setting module 122 generates the learning model using the sample image received by the setting reception module 121 so far, and stored in the setting table in association with the corresponding user ID, the sample medium ID, the application, and the setting information. The setting module 122 prior-learns the learning model so that a high value is output when the corresponding sample image is input, and a low value is output when an image other than the corresponding sample image is input. When the image information is the image feature amount, the setting module 122 calculates the image feature amount from the sample image received by the setting reception module 121 using a known image processing technique. Further, when the image information is the sample image itself, the setting module 122 sets the sample image itself received by the setting reception module 121 as the image information.

Thus, the setting module 122 sets the image information relating to the setting information and the sample image for each of the plurality of applications in the setting table. The setting module 122 sets the setting information and the image information for each of the plurality of applications for the plurality of sample media in the setting table for each of the plurality of user IDs. Thus, the image processing system 1 can register the setting information and the image information suitable for the application of each user or the type of the medium to be read for each user, and can propose the setting suitable for each user. Thus, the setting process ends.

Figure 11:
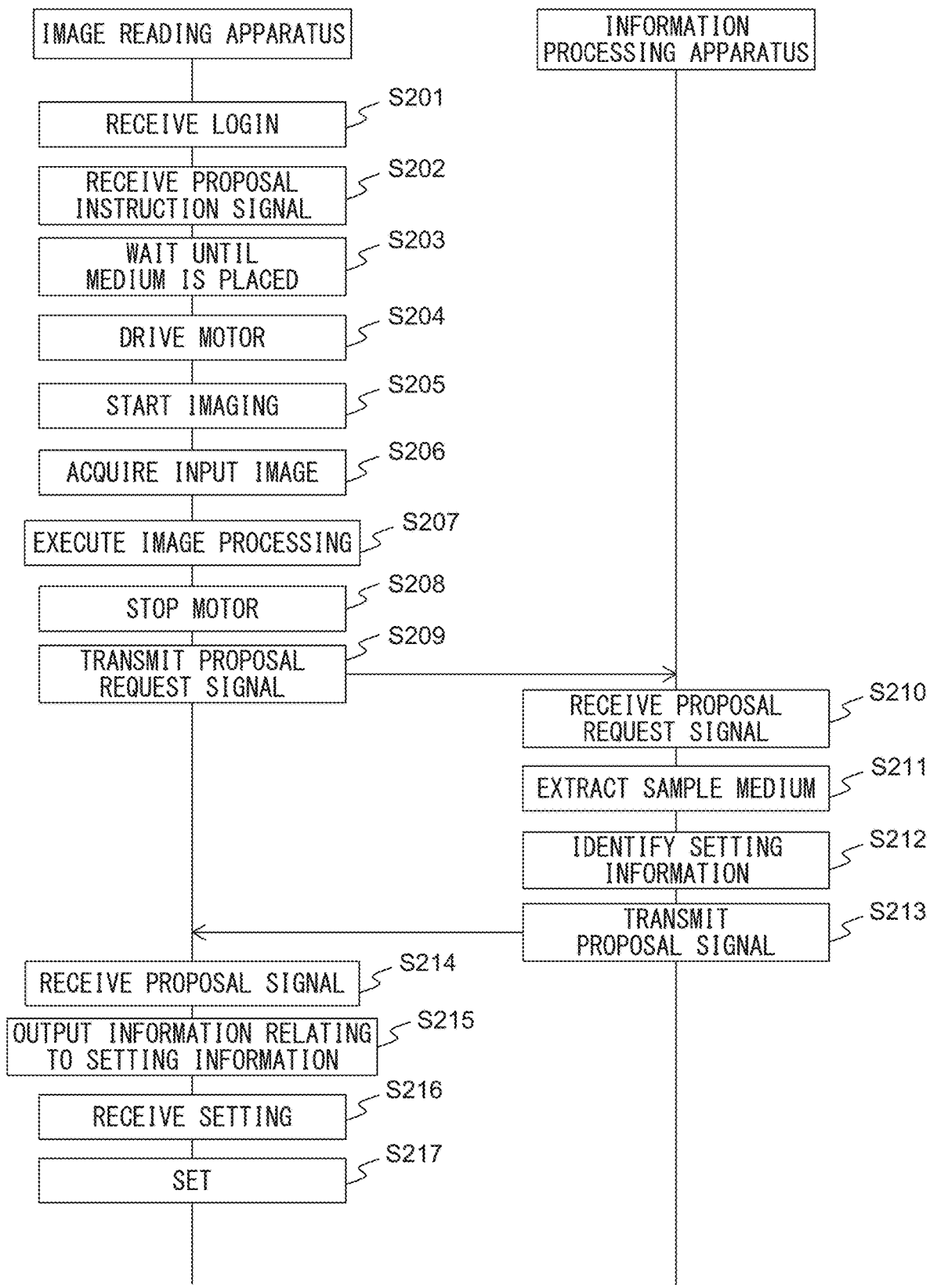
FIG. 11 is an operation sequence illustrating an operation example of a proposal process.

FIG. 11 is an operation sequence illustrating an operation example of the proposal process by the image processing system 1.

The operation sequence described below is executed mainly by the first processing circuit 120 and the second processing circuit 240 in cooperation with each element in the information processing apparatus 100 and the image reading apparatus 200, in accordance with a program previously stored in the first storage device 110 and the second storage device 230.

First, in the same manner as the process in step S101 of FIG. 10, the proposal control module 242 in the image reading apparatus 200 receives the login to the image reading apparatus 200 by the user (step S201). When the login by the user has already been received, the process of step S201 may be omitted.

Next, the proposal control module 242 waits until it receives a proposal instruction signal for instructing a proposal of the setting information from the user using the operation device 205, or the control computer via the second communication device 222 (step S202).

Next, in the same manner as the process of step S103 of FIG. 10, the proposal control module 242 waits until the medium is placed on the medium tray 203 (step S203). The user places the medium to be read on the medium tray 203.

Next, the proposal control module 242 drives the motor 221 to move the medium tray 203 to a position where the medium and the pick roller 212 abut. The proposal control module 242 drives the motor 221 to rotate the pick roller 212, the feed roller 213, the separation roller 214, and the first to eighth conveying rollers 216*a* to 216*h* to convey the medium placed on the medium tray 203 (step S204). The proposal control module 242 controls the rotation speed of the motor 221 so that the medium is imaged, according to the default resolution set in advance in the image reading apparatus 200.

Next, the proposal control module 242 causes the imaging device 218 to start imaging the medium (step S205). The proposal control module 242 controls the imaging device 218 so that the medium is imaged according to the default resolution set in advance in the image reading apparatus 200.

Next, the proposal control module 242 acquires the input image from the imaging device 218, and stops the imaging by the imaging device 218 when the conveyance of the medium is completed (step S206).

Next, the proposal control module 242 executes the image processing to the acquired input image according to the default setting content set in advance in the image reading apparatus 200 (step S207).

Next, the proposal control module 242 stops the motor 221, to stop the pick roller 212, the feed roller 213, the separation roller 214, and the first to eighth conveying rollers 216*a* to 216*h* (step S208).

Next, the second transmission module 243 transmits the proposal request signal for requesting the proposal of the setting information to the information processing apparatus 100 via the second communication device 222 (step S209), The proposal request signal includes the user ID acquired in step S201 and the input image acquired in step S206 in which the image processing is executed in step S207.

Next, the first reception module 123 in the information processing apparatus 100 receives the proposal request signal from the image reading apparatus 200 via the first communication device 103 (step S210). The first reception module 123 acquires the user ID and the input image included in the received proposal request signal. Thus, the first reception module 123 receives the user ID along with the input image from the image reading apparatus 200.

Next, the extraction module 124 extracts a predetermined number of sample media in a descending order of a similarity between the corresponding sample image and the input image acquired by the first reception module 123 (hereinafter, may be referred to as a similarity degree), from among the sample media set in the setting table (step S211). The predetermined number is set to any number of one or more (e.g., 3). The predetermined number may be set by the user. The predetermined number may be changed for each user. The extraction module 124 extracts each image information stored in association with the user ID received by the first reception module 123 in the setting table.

When the image information is the learning model, the extraction module 124 inputs the input image received by the first reception module 123 to each learning model stored as the image information in the setting table, and acquires the output value output from each learning model, as the similarity degree. When the image information is the image feature amount, the setting module 122 calculates the image feature amount of the same type as the type of the image feature amount stored as the image information in the setting table from the input image received by the first reception module 123, using a known image processing technique. The setting module 122 calculates, for example, an inner product or cosine similarity degree between the calculated image feature amount (vector) and each image feature amount (vector) stored as the image information in the setting table, as the similarity degree. When the image information is the sample image itself, the setting module 122 calculates the inverse of the Sum of Squared Difference (SSD), the inverse of the Sum of Absolute Difference (SAD) or the normalized cross-correlation value, etc., between the input image received by the first reception module 123 and the sample image stored as the image information in the setting table, as the similarity degree.

The extraction module 124 calculates a statistical value (e.g., an average value, a median value, a maximum value or a minimum value, etc.) of the similarity degree for each corresponding image information for each sample medium set in the setting table, and extracts the predetermined number of sample media in a descending order of the calculated statistical value. Thus, the extraction module 124 extracts the predetermined number of sample media in a descending order of the similarity between the corresponding sample image and the input image, among from the plurality of sample media, based on the image information set in the setting table. In particular, the extraction module 124 extracts the predetermined number of sample media from among the sample media corresponding to the user ID received by the first reception module 123. Thus, the extraction module 124 can propose a setting more suitable for each user, for each user.

Next, the identifying module 125 identifies the setting information for each of the plurality of applications for each of the predetermined number of sample media extracted by the extraction module 124 (step S212). The identifying module 125 identifies each setting information stored in association with each of the extracted predetermined number of sample media in the setting table, and identifies the setting contents of the setting information in the detailed table.

Next, the first transmission module 126 outputs the proposal signal for proposing the setting information by transmitting it to the image reading apparatus 200 via the first communication device 103 (step S213). The proposal signal includes the setting information (the setting content) for each of the plurality of applications identified by the identifying module 125, and the application corresponding to each setting information.

Next, the second reception module 244 in the image reading apparatus 200 receives the proposal signal from the information processing apparatus 100 via the second communication device 222 (step S214). The second reception module 244 acquires the setting information (the setting content) for each of the plurality of applications included in the received proposal signal, and the application corresponding to each setting information.

Next, the output control module 245 outputs information relating to the setting information for each of the plurality of applications received by the second reception module 244 (step S215). For example, the output control module 245 outputs the setting information (the setting content) itself for each of a plurality of applications, as the information relating to the setting information for each of the plurality of applications.

The output control module 245 may output the image in which the medium is imaged or the image processing is executed according to the setting information for each of the plurality of applications received from the information processing apparatus 100, as the information relating to the setting information for each of the plurality of applications. In that case, the output control module 245 executes the same process as the process in steps S203 to S208 as many times as acquired by multiplying the number of the plurality of applications and the predetermined number. In step S203, the output control module 245 causes the user to reload the medium to be read, which was initially placed in the proposal process, on the medium tray 203. In step S204, the output control module 245 controls the rotation speed of the motor 221 so that the medium is imaged according to the resolution specified by each received setting information. In step S205, the output control module 245 controls the imaging device 218 so that the medium is imaged according to the resolution specified by each received setting information. In step S208, the output control module 245 executes the image process on the acquired input image according to the setting content of each item set by each received setting information.

When executing the processes of steps S204 to S206 first, the proposal control module 242 may cause the imaging device 218 to generate the input image having the maximum resolution supported by the image reading apparatus 200. In that case, the output control module 245 executes the thinning process or the interpolation process so as to change the resolution of the input image, and executes the image processing on the input image, according to the setting content of each item set by the received setting information.

Thus, the user can visually recognize the features and effects of each setting information using an image, and thereby, the image processing system 1 can improve the convenience of the user.

The output control module 245 outputs the information relating to the setting information for each of a plurality of applications, by displaying it on the display device 206. The output control module 245 may output the information relating to the setting information for each of the plurality of applications, by transmitting it to the control computer via the first communication device 103. In this case, the control computer displays the received information relating to the setting information for each of the plurality of applications.

Figure 12:
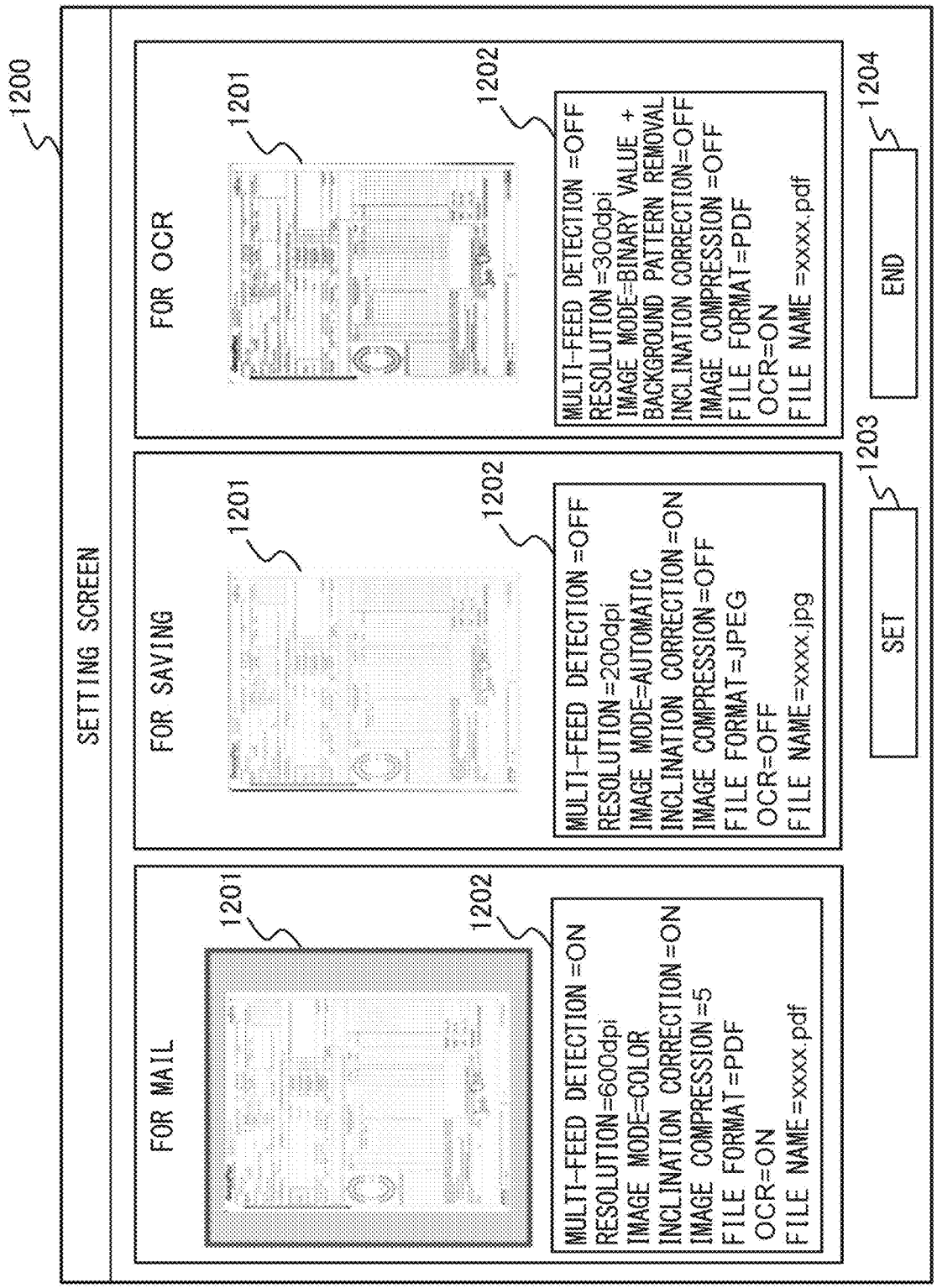
FIG. 12 is a schematic diagram illustrating an example of a proposal screen 1200.

FIG. 12 is a schematic diagram illustrating an example of a proposal screen 1200 including the information relating to the setting information for the plurality of applications displayed on the display device 206 or the control computer.

As shown in FIG. 12, the proposal screen 1200 includes the input image 1201 and the setting content 1202 for each of the plurality of applications, and further includes the setting button 1203 and the end button 1204, etc. Each input image 1201 is an input image in which the medium is imaged and the image processing is executed, according to the setting information corresponding to each application. Each setting content 1202 is a setting content set in the setting information corresponding to each application. In the proposal screen 1200, each input image 1201 is selectably displayed so that the user selects any application. Each setting content 1202 is selectably displayed so that the user selects any application. The setting button 1203 is a button for setting the setting information corresponding to the selected input image 1201 in the image reading apparatus 200. The end button 1204 is a button for ending the display of the proposal screen 1200.

In the proposal screen 1200, only the input image 1201 and the setting content 1202 for each of the plurality of applications corresponding to one sample medium are displayed. However, in the proposal screen, the input image and the setting content for each of the plurality of applications corresponding to a predetermined number of sample media extracted by the extraction module 124 may be displayed.

Since diversification of the setting information relating to the imaging of the medium or the image processing has advanced, recently, by the improvement of the imaging technique and the image processing technique, it is difficult for users unfamiliar with the scanner to correctly, understand the features and effects of the various setting information. Also, even users who are somewhat familiar with the scanner, may not know or may miss the existence of the optimum setting information. The information processing apparatus 100 displays the setting information for each application side by side and displays the images generated according to each setting information side by side, so that each user can intuitively understand the features and effects of each setting information. Therefore, the user can select appropriate setting information according to the application of the user or the type of the medium to be read from among various setting information.

Next, the output control module 245 determines whether or not it has received the setting instruction of the setting information by the user (step S216). When the setting button 1203 of the proposal screen 1200 is pressed by the user using the operation device 205 or the control computer, the output control module 245 receives the setting instruction of the setting information by the user. When receiving the setting instruction of the setting information by the user, the output control module 245 ends the series of steps without performing particularly process.

When receiving the setting instruction of the setting information by the user, the output control module 245 sets the setting information corresponding to the input image 1201 selected by the user in the second storage device 230 (step S217). The output control module 245 sets the setting information in association with the user ID acquired in step S201 in the second storage device 230. Thus, the proposal process ends.

Figure 13:
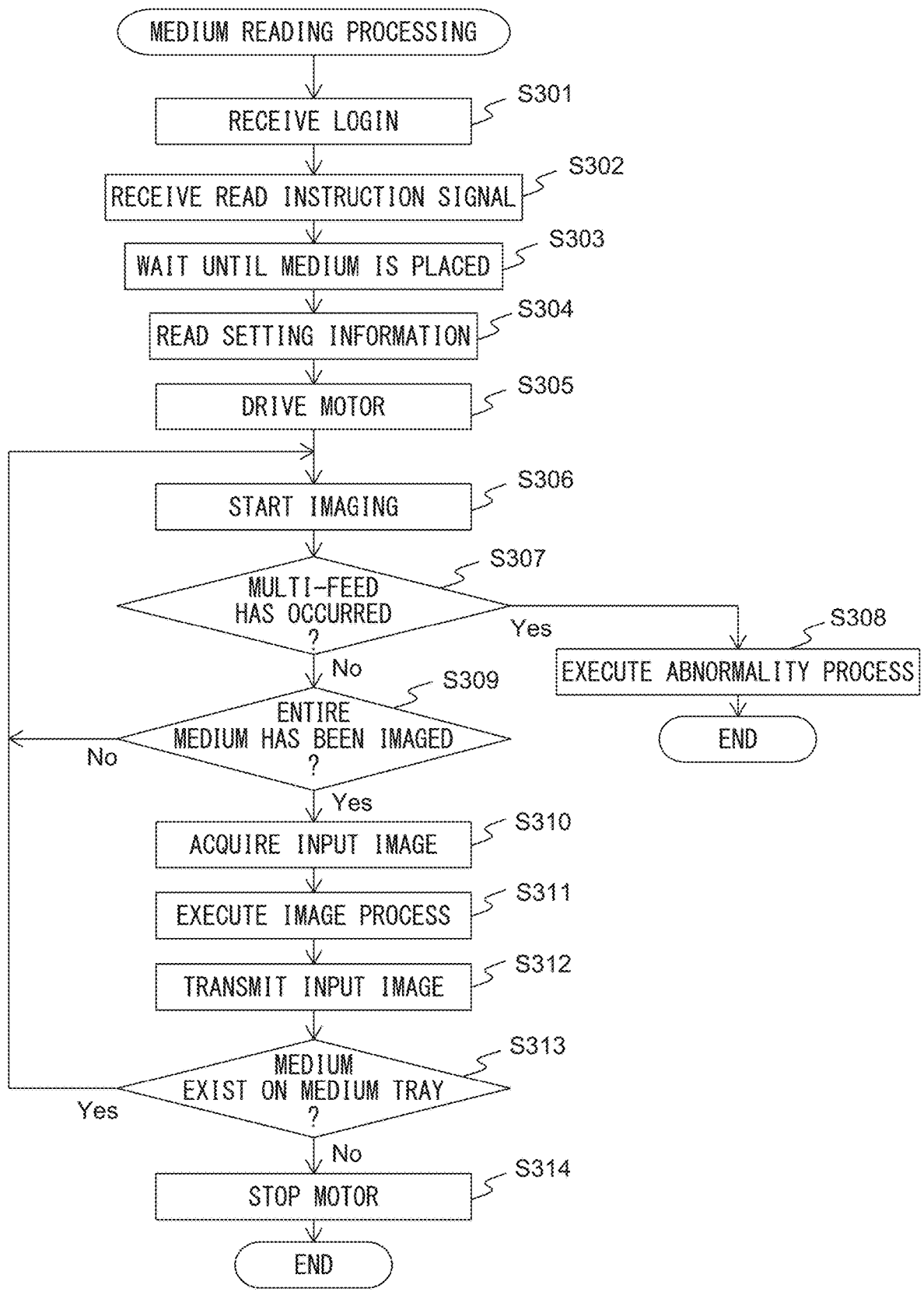
FIG. 13 is a flowchart illustrating an operation example of a medium reading process.

FIG. 13 is a flowchart illustrating an operation example of a medium reading process in the image reading apparatus 200.

Referring to the flowchart illustrated in FIG. 13, the operation example of the medium reading process in the image reading apparatus 200 will be described below. The operation flow described below is executed mainly by the second processing circuit 240 in cooperation with each element in the image reading apparatus 200, in accordance with a program previously stored in the second storage device 230.

First, in the same manner as the process in step S101 of FIG. 10, the control module 246 receives the login to the image reading apparatus 200 by the user (step S301). When the login by the user has already been received, the process of step S301 may be omitted.

Next, the control module 246 waits until it receives a read instruction signal for instructing the reading of the medium from the user using the operating device 205 or the control computer via the second communication device 222 (step S302).

Next, in the same manner as the process of step S103 of FIG. 10, the control module 246 waits until the medium is placed on the medium tray 203 (step S303). The user places the medium to be read on the medium tray 203.

Next, the control module 246 reads out the setting information set in association with the user ID acquired in step S301 in the second storage device 230 (step S304).

Next, the control module 246 drives the motor 221 to move the medium tray 203 to a position where the medium and the pick roller 212 abut. The control module 246 drives the motor 221 to rotate the pick roller 212, the feed roller 213, the separation roller 214, and the first to eighth conveying rollers 216a to 216h to convey the medium placed on the medium tray 203 (step S305). The control module 246 controls the rotation speed of the motor 221 so that the medium is imaged according to the resolution specified in the read setting information.

Next, the control module 246 causes the imaging device 218 to start imaging the medium (step S306). The control module 246 controls the imaging device 218 so that the medium is imaged according to the resolution specified in the read setting information.

Next, the control module 246 determines whether or not the multi-feed of the medium has occurred (step S307). However, when the multi-feed detection is set to OFF, the control module 246 shifts the process to step S309 without executing the process in step S307. The control module 246 determines whether or not the multi-feed of the medium has occurred, only when the multi-feed detection is set to ON in the read setting information. The control module 246 acquires the ultrasonic signal from the ultrasonic sensor 215, and determines whether or not a signal value of the acquired ultrasonic signal is less than the multi-feed threshold value. The multi-feed threshold value is set to a value between a signal value of an ultrasonic signal when a sheet of paper is conveyed and a signal value of an ultrasonic signal when a multi-feed of paper has occurred.

When the signal value of the ultrasonic signal is less than the multi-feed threshold value, the control module 246 determines that the multi-feed of the medium has occurred, and executes an abnormality process (step S308), and ends the series of steps. The control module 246 stops the motor 221, to stop the conveyance of the medium, as the abnormal process. The control module 246 displays information indicating that the multi-feed of the medium has occurred on the display device 206 or transmits the information to the control computer via the second communication device 222, to notify the user, as the abnormal process.

On the other hand, when the signal value of the ultrasonic signal is equal to or greater than the multi-feed threshold, the control module 246 determines that the multi-feed of the medium has not occurring, and determines whether or not the entire medium has been imaged by the imaging device 218 (step S309). The control module 246, for example, determines that the entire conveyed medium has been imaged by the imaging device 218, when a predetermined time has elapsed since the start of the conveyance of the medium. The control module 246 may determine whether or not the rear end of the medium has passed through the position of the medium sensor, based on the detection result of the medium by the medium sensor (not shown) located around the imaging device 218. In that case, the control module 246 determines that the entire medium has been imaged by the imaging device 218 when a predetermined time has elapsed since the rear end of the medium has passed through the position of the medium sensor. When the entire medium has not been yet imaged, the control module 246 returns the process to step S306.

On the other hand, when the entire medium has been imaged, the control module 246 acquires the input image from the imaging device 218, and stops the imaging by the imaging device 218 (step S310).

Next, the control module 246 executes the image processing on the acquired input image according to each setting content specified by the read setting information (step S311).

Next, the control module 246 transmits the input image acquired in step S310 in which the image processing is executed in step S311 to the control computer via the second communication device 222 (step S312).

Next, the control module 246 determines whether or not the medium remains on the medium tray 203, based on the medium signal acquired from the medium sensor 211 (step S313). When a medium remains on the medium tray 203, the control module 246 returns the process to step S306 and repeats the processes in steps S306 to S313.

On the other hand, when no medium remains in the medium tray 203, the control module 246 stops the motor 221, to stop the pick roller 212, the feed roller 213, the separation roller 214, and the first to eighth conveying rollers 216a to 216h, to stop the conveyance of the medium (step S314). Thus, the medium reading process ends.

The processes in steps S101 to S109 in the setting process illustrated in FIG. 10 may be executed by the image reading apparatus 200 that differs from the image reading apparatus 200 that executes the proposal process illustrated in FIG. 11 and the image reading process illustrated in FIG. 13. In particular, the processes in steps S101 to S109 in FIG. 10 may be executed by the image reading apparatus for setting used by the system administrator among the plurality of image reading apparatus 200. In that case, in step S110, the setting reception module 121 in the information processing apparatus 100 receives the setting request signal from the image reading apparatus for setting via the first communication device 103. Thus, in the setting table, the setting information and the image information are registered only by the system administrator having sufficient knowledge of the image reading apparatus, so that the image processing system 1 can register only appropriate setting information and image information.

In the setting table, the setting information and the image information for each of the plurality of applications may not be managed for each user ID. In that case, the processes in step S101 in FIG. 10, step S201 in FIG. 11, step S301 in FIG. 13 may be omitted. The setting control module 241 does not include the user ID in the setting request signal in the process in step S109 in FIG. 10, and the setting module 122 sets the sample medium ID, the application, the setting information, the sample image and the image information without being in association with the user ID in the process in step S1.10. The second transmission module 243 does not include the user ID in the proposal request signal in the process in step S209 in FIG. 11, and the extraction module 124 extracts the predetermined number of sample media in the descending order of the similarity degree, regardless of the user ID in the process in step S211.

One learning model may be generated for the plurality of sample media and applications, instead that the learning model is generated separately for each sample medium and application. In this case, the setting module 122 pre-learns the learning model so that a plurality of sample media IDs and evaluation values for each application are output when an image is input. The setting module 122 learns the learning model so that, when each sample image is input, each evaluation value of the sample medium ID and the application corresponding to each sample image is high, and each evaluation value of the sample medium ID and the application not corresponding to each sample image is low. The extraction module 124 inputs the input image to the learning model, and extracts the predetermined number of sample media in a descending order of the evaluation value output from the learning model, as the predetermined number of sample media in a descending order of the similarity degree.

Further, the setting module 122 may pre-learn the learning model so that, when the image is input, the predetermined number of sample medium IDs are output in a descending order of the evaluation value for the plurality of sample medium IDs and applications. In that case, the extraction module 124 inputs the input image to the learning model and extracts the sample media corresponding to the predetermined number of sample medium IDs output from the learning model, as the predetermined number of sample media in a descending order of the similarity degree.

In these cases, one learning model includes the image information relating to the sample image generated according to each setting information for each of the plurality of applications for the plurality of sample media.

Further, the processes in step S307 to S308 in FIG. 13 may be omitted.

As described in detail above, the information processing apparatus 100 stores the setting information and the information relating to the sample image for each application for the plurality of sample media. The information processing apparatus 100 outputs the setting information for each application for the sample medium of which the sample image is similar to the input image generated by the image reading apparatus 200. Thus, the user can select and set the appropriate setting information according to the application of the user and the type of the medium to be read from among various setting information. Therefore, the image processing system 1 can improve the convenience in the setting of the image reading apparatus 200.

In particular, recently, in the image reading apparatus 200, in order to meet the needs of various markets, the diversification of the setting information relating to the imaging of the medium or the image processing has advanced. For example, in companies performing form processing, automatic recognition of characters by using the Optical Character Recognition (OCR) technique from images in which the medium, such as the form, is read, is performed to improve the efficiency of business. However, it is difficult for a user unfamiliar with the scanner to select the setting information for generating an image suitable for the OCR from among various setting information. Since the information processing apparatus 100 collectively outputs the setting information for each of a plurality of applications for the medium used by the user, the user can select the appropriate mode according to the application of the user and the type of the medium to be read from among various setting information.

Since the image processing system 1 manages the setting information for each user ID, even when a maintenance person of the image reading apparatus 200 is changed, a new maintenance person can correctly recognize the setting requested by the user of the image reading apparatus 200. Therefore, the image processing system 1 can provide appropriate services for each user.

Figure 14:
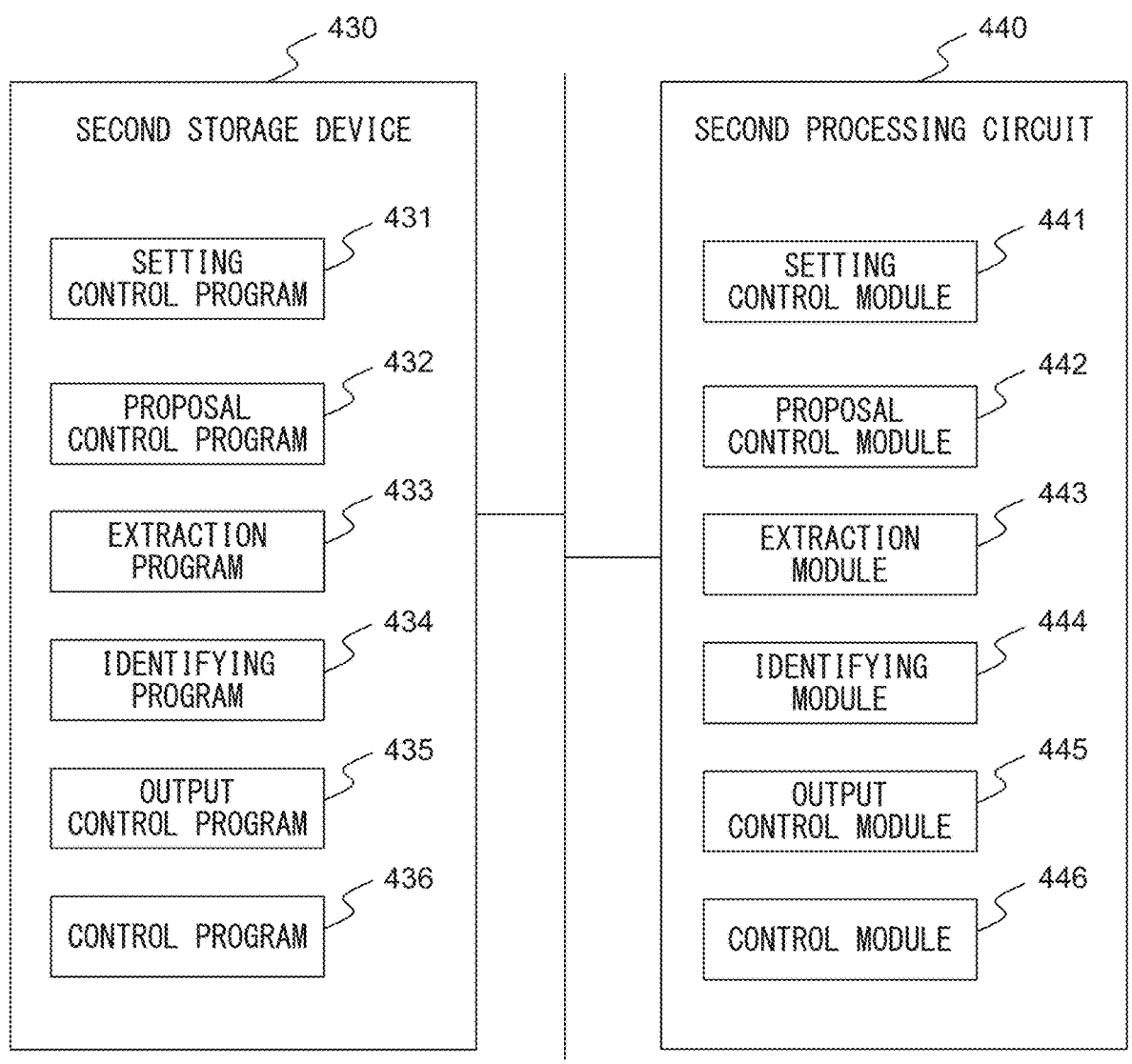
FIG. 14 is a diagram illustrating a schematic configuration of a second storage device 430 and a second processing circuit 440.

FIG. 14 is a diagram illustrating a schematic configuration of a second storage device 430 and a second processing circuit 440 in the image reading apparatus according to another embodiment.

The second storage device 430 and the second processing circuit 440 has the same configuration as the second storage device 230 and the second processing circuit 240, and are used in place of the second storage device 230 and the second processing circuit 240, respectively. The second storage device 430 is an example of a storage device.

As shown in FIG. 14, a setting control program 431, a proposal control program 432, an extraction program 433, an identifying program 434, an output control program 435 and a control program 436, etc., are stored in the second storage device 430. Each of these programs is a functional module implemented by software operating on a processor. The second processing circuit 440 reads each program stored in the second storage device 430 and operates according to each read program. Thus, the second processing circuit 240 functions as a setting control module 441, a proposal control module 442, an extraction module 443, an identifying module 444, an output control module 445 and a control module 446. The setting control module 441, the proposal control module 442, the extraction module 443, the identifying module 444, the output control module 445 and the control module 446 execute the process similar to the setting control module 241, the proposal control module 242, the extraction module 124, the identifying module 125, the output control module 245 and the control module 246, respectively.

When the second storage device 430 and the second processing circuit 440 are used, the setting table and the detail table are stored in the second storage device 430. In the setting process of FIG. 10, the processes in steps S109 to S110 are omitted, and the processes in steps S111 to S112 are executed by the setting control module 441 in the image reading apparatus.

In the proposal process in FIG. 11, the processes in steps S209 to S210, S213 to S214 are omitted, the process in step S211 is executed by the extraction module 443 in the image reading apparatus, and the process in step S212 is executed by the identifying module 444 in the image reading apparatus. In step S211, the extraction module 443 acquires the user ID acquired in step S201, and the input image acquired in step S206 in which the image processing is executed in step S207 from the proposal control module 442. In step S215, the output control module 445 outputs the information relating to the setting information for each of the plurality of applications identified by the identifying module 444. The output control module 445 outputs the image in which the medium is imaged or the image process is executed according to the setting information for each of the plurality of applications identified by the identifying module 444, as the information relating to the setting information for each of the plurality of applications.

As described in detail above, the image processing system can improve the convenience in the setting of the image reading apparatus even when the image reading apparatus manages the setting information.

Figure 15:
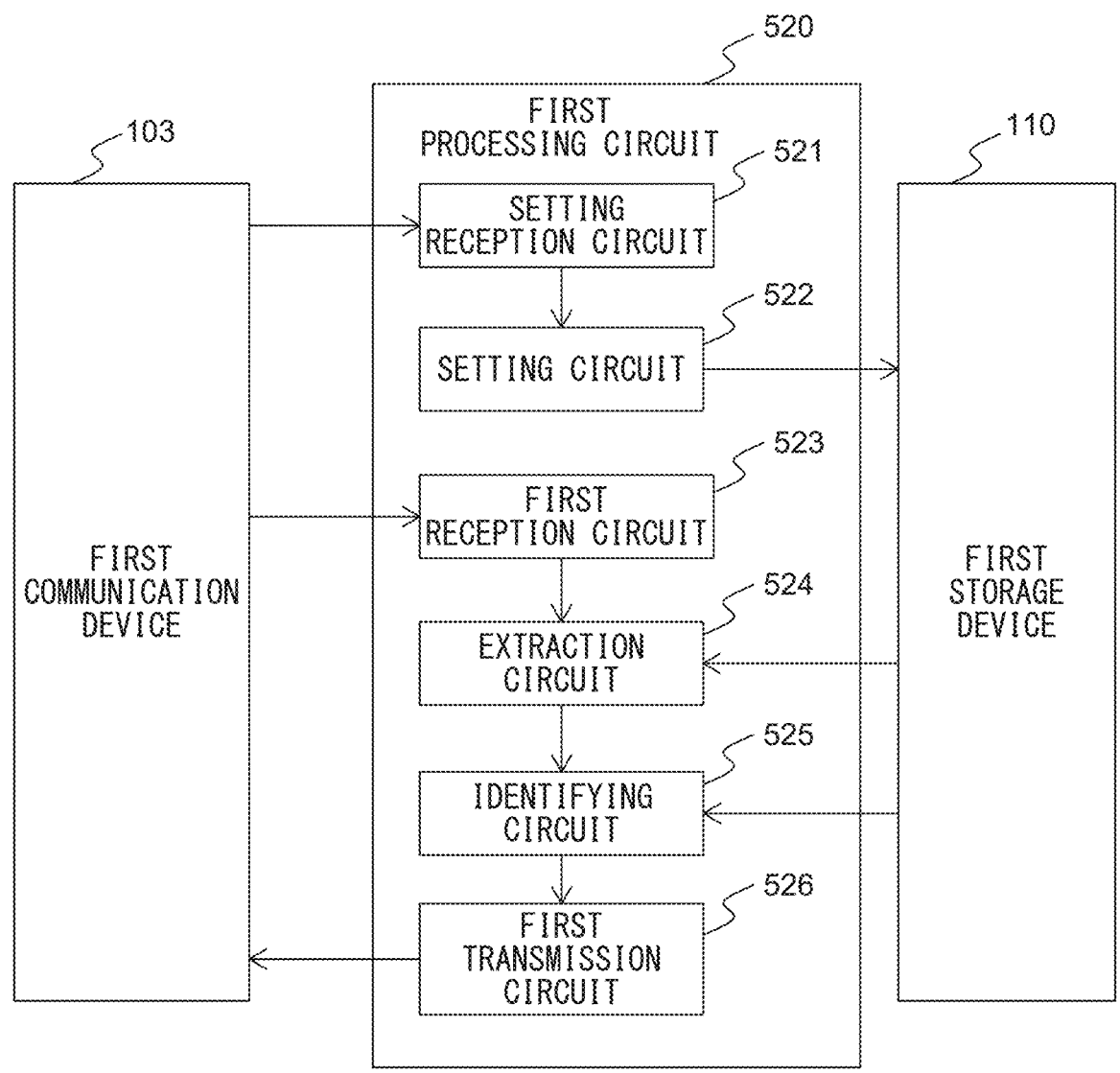
FIG. 15 is a diagram illustrating a schematic configuration of another first processing circuit 520.

FIG. 15 is a diagram illustrating a schematic configuration of a first processing circuit 520 in an information processing apparatus according to another embodiment. The first processing circuit 520 is used in place of the first processing circuit 120 in the information processing apparatus 100 and executes the setting process and proposal processing, etc., instead of the first processing circuit 120. The first processing circuit 520 includes a setting reception circuit 521, a setting circuit 522, a first reception circuit 523, an extraction circuit 524, an identifying circuit 525 and a first transmission circuit 526, etc. Note that each unit may be configured by an independent integrated circuit, a microprocessor, firmware, etc.

The setting reception circuit 521 is an example of a setting reception module, and has a function similar to the setting reception module 121. The setting reception circuit 521 receives the setting request signal from the image reading apparatus via the first communication device 103, and outputs each information included in the received setting request signal to the setting circuit 527.

The setting circuit 522 is an example of a setting module, and has a function similar to the setting module 122. The setting circuit 522 receives the information included in the setting request signal from the setting receiving circuit 521, and sets the setting table and the detail table in the first storage device 110 based on the received information.

The first reception circuit 523 is an example of a first reception module, and has a function similar to the first reception module 123. The first reception circuit 523 receives the input image from the image reading apparatus via the first communication device 103, and outputs the received input image to the extraction circuit 524.

The extraction circuit 524 is an example of an extraction module, and has a function similar to the extraction module 124. The extraction circuit 524 receives the input image from the first receiving circuit 523, and reads out the setting table from the first storage device 110. The extraction circuit 524 extracts the predetermined number of sample media based on the received and read information, and outputs the extraction result to the identifying circuit 525.

The identifying circuit 525 is an example of an identifying module, and has a function similar to the identifying module 125. The identifying circuit 525 receives the extraction result of the sample medium from the extraction circuit 524, and reads out the setting table and the detail table from the first storage device 110. The identifying circuit 525 identifies the setting information for each of the plurality of applications, based on the received and read information, and outputs an identified result to the first transmission circuit 526.

The first transmission circuit 526 is an example of a first transmission module, and has a function similar to the first transmission module 126. The first transmission circuit 526 receives the identified result of the setting information for each of the plurality of applications from the identifying circuit 525, and transmits the proposal signal to the image reading apparatus via the first communication device 103.

As described in detail above, the image processing system 1 can improve the convenience in the setting of the image reading apparatus even when the information processing apparatus uses the first processing circuit 520.

Figure 16:
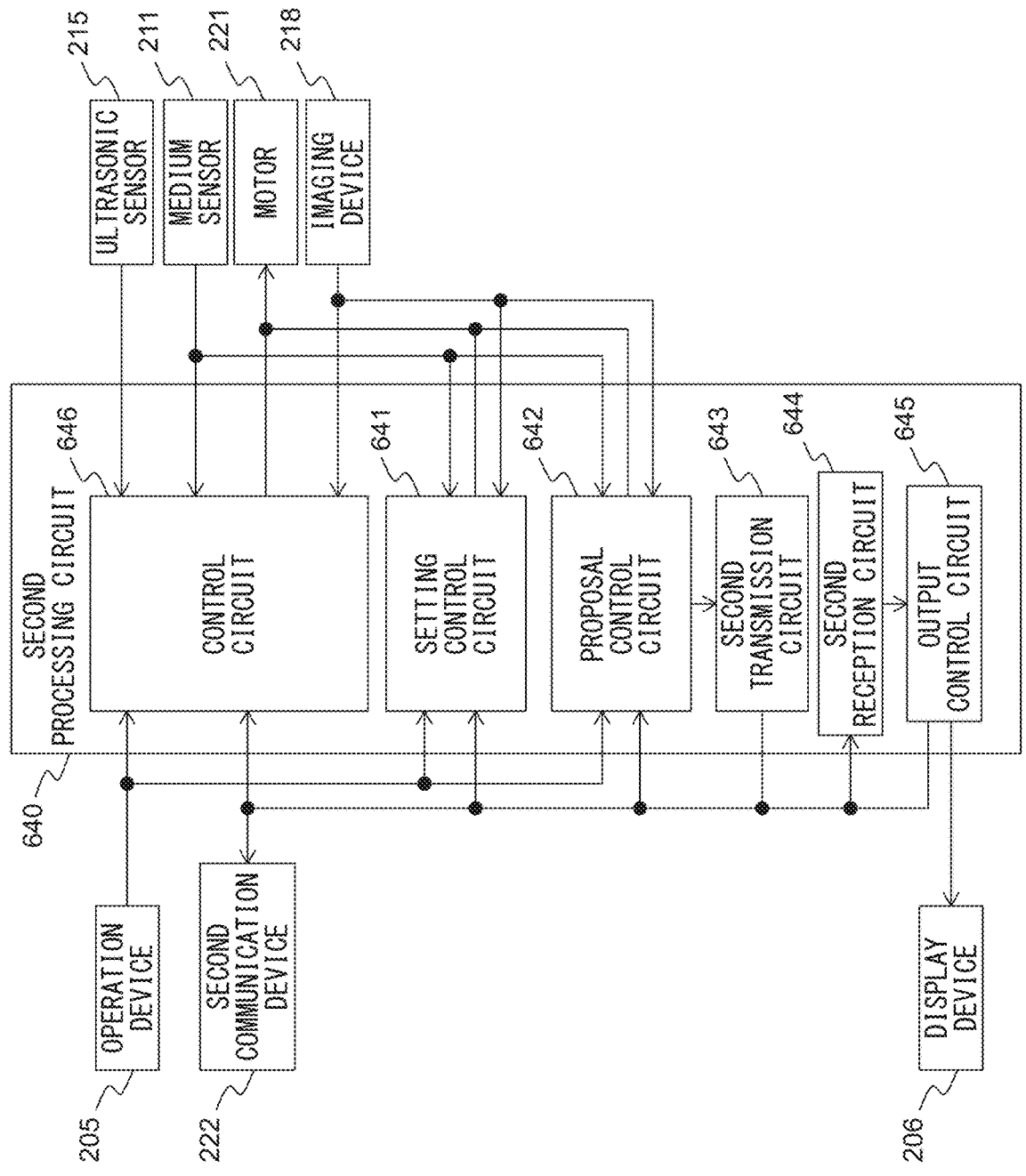
FIG. 16 is a diagram illustrating a schematic configuration of another second processing circuit 640.

FIG. 16 is a diagram illustrating a schematic configuration of a second processing circuit 640 in an image reading apparatus according to another embodiment. The second processing circuit 640 is used in place of the second processing circuit 240 in the image reading apparatus 200, and executes the setting process, the proposal process, the medium reading process, etc., instead of the second processing circuit 240. The second processing circuit 640 includes a setting control circuit 641, a proposal control circuit 642, a second transmission circuit 643, a second reception circuit 644, an output control circuit 645 and a control circuit 646, etc. Note that each unit may be configured by an independent integrated circuit, a microprocessor, firmware, etc.

The setting control circuit 641 is an example of a setting control module, and has a function similar to the setting control module 241. The setting control circuit 641 receives the setting instruction signal from the operation device 205 or the second communication device 222, the medium signal from the medium sensor 211, controls the motor 221 based on each received information, and receives the input image from the imaging device 218. The setting control circuit 641 transmits the setting request signal to the information processing apparatus via the second communication device 222.

The proposal control circuit 642 is an example of the proposal control module and has a function similar to the proposal control module 242. The proposal control circuit 642 receives the proposal instruction signal from the operation device 205 or the second communication device 222 and the medium signal from the medium sensor 211, controls the motor 221 based on each received information, and receives the input image from the imaging device 218. The proposal control circuit 642 outputs each information included in the proposal instruction signal and the input image to the second transmission circuit 643.

The second transmission circuit 643 is an example of a second transmission module, and has a function similar to the second transmission module 243. The second transmission circuit 643 receives each information from the proposal control circuit 642, and transmits the proposal request signal to the information processing apparatus via the second communication device 222.

The second receiving circuit 644 is an example of a second reception module, and has a function similar to the second reception module 244. The second receiving circuit 644 receives each information for each of the plurality of applications from the information processing apparatus via the second communication device 222, and outputs it to the output control circuit 645.

The output control circuit 645 is an example of an output control module, and has a function similar to the output control module 245. Output control circuit 645 receives each information for each of the plurality of applications from the second receiving circuit 644, and outputs it to the display device 206 or the control computer via the second communication device 222.

The control circuit 646 is an example of a control module and has a function similar to the control module 246. The control circuit 646 receives the read instruction signal from the operating device 205 or the second communication device 222, the medium signal from the medium sensor 211, the ultrasonic signal from the ultrasonic sensor 215, controls the motor 221 based on each received information, and receives the input image from the imaging device 218. The control circuit 646 outputs the input image to the control computer via the second communication device 222.

As described in detail above, the image processing system 1 can improve the convenience in the setting of the image reading apparatus even when the image reading apparatus uses the second processing circuit 640.

Figure 17:
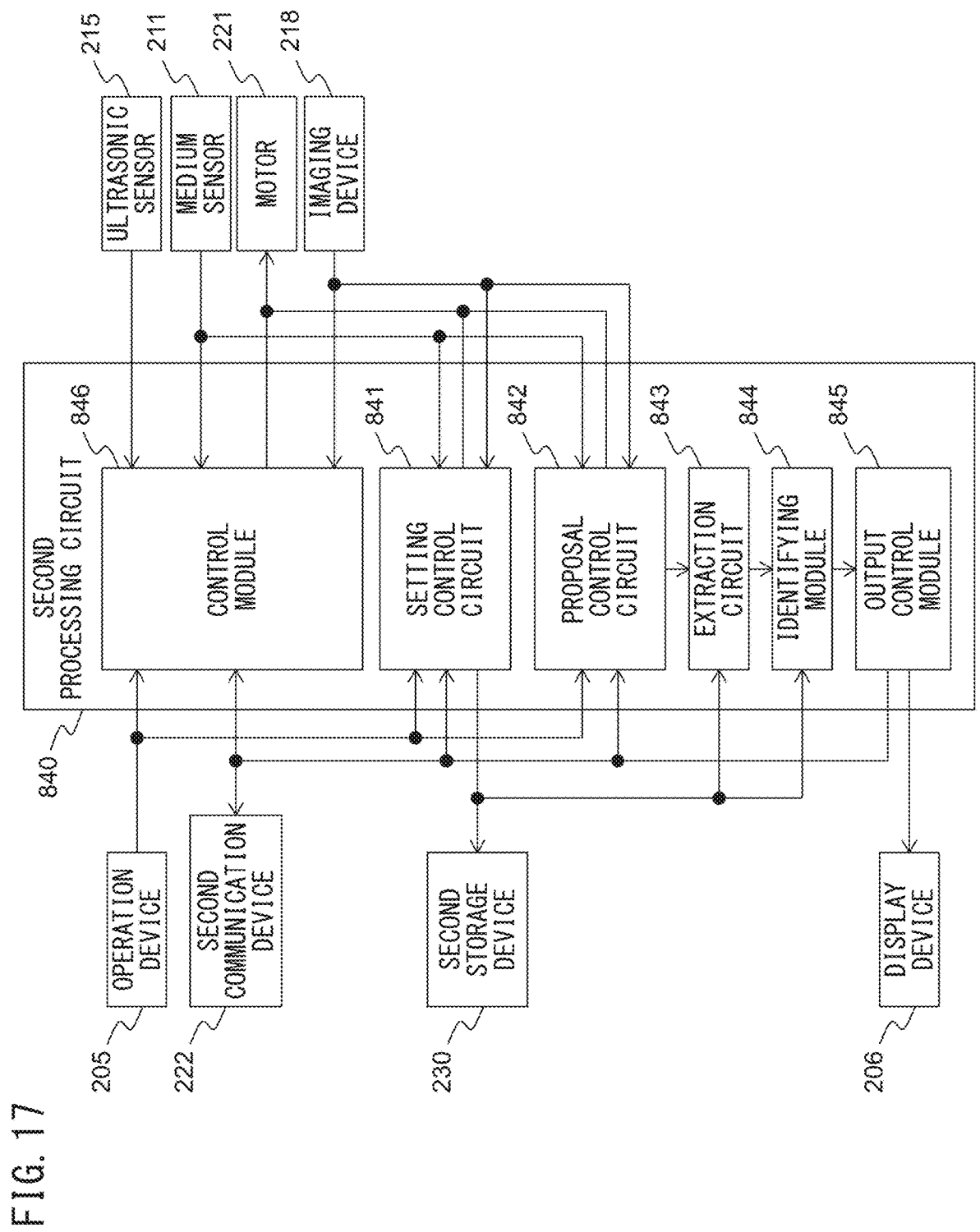
FIG. 17 is a diagram illustrating a schematic configuration of another second processing circuit 840, etc.

FIG. 17 is a diagram illustrating a schematic configuration of a second processing circuit 840 in an image reading apparatus according to another embodiment. The second processing circuit 840 is used in place of the second processing circuit 440 in the image reading apparatus, and executes the setting process, the proposal process, the medium reading process, etc., instead of the second processing circuit 440. The second processing circuit 840 includes a setting control circuit 841, a proposal control circuit 842, an extraction circuit 843, an identifying circuit 844, an output control circuit 845, a control circuit 846, etc. Note that each unit may be configured by an independent integrated circuit, a microprocessor, firmware, etc.

The setting control circuit 841, the proposal control circuit 842, the output control circuit 845 and the control circuit 846 have a function similar to the setting control circuit 641, the proposal control circuit 642, the output control circuit 645 and the control circuit 646, respectively. However, the setting control circuit 841 sets the setting table in the first storage device 110 based on each received information. The proposal control circuit 842 outputs each information included in the proposal instruction signal and the input image to the extraction circuit 843. The output control circuit 845 receives each information for each of the plurality of applications from the identifying circuit 844, and outputs it to the display device 206 or the control computer via the second communication device 222.

The extraction circuit 843 is an example of an extraction module, and has a functions similar to the extraction module 443. The extraction circuit 843 receives the input image from the proposal control circuit 842 and reads out the setting table from the second storage device 230. The extraction circuit 843 extracts the predetermined number of sample media based on the received and read information, and outputs an extraction result to the identifying circuit 844.

The identifying circuit 844 is an example of an identifying module, and has a function similar to the identifying module 444. The identifying circuit 844 receives the extraction result of the sample medium from the extraction circuit 843 and reads out the setting table and the detail table from the second storage device 230. The identifying circuit 844 identifies the setting information for each of the plurality of applications based on the received and read information, and outputs an identified result to the output control circuit 845.

As described in detail above, the image processing system 1 can improve the convenience in the setting of the image reading apparatus even when the image reading apparatus uses the second processing circuit 840.

The information processing apparatus, the image reading apparatus, the image processing system, the control method and the control program according to the embodiment can improve the convenience in the setting of the image reading apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, What is claimed is:

1. An information processing apparatus comprising:
a storage device to store, for a plurality of sample media, for each of a plurality of applications, setting information relating to imaging of a medium or an image processing, and image information relating to a sample image generated according to the setting information;
a communication device; and
a processor to
receive an input image from an image reading apparatus via the communication device,
extract a predetermined number of sample media in a descending order of similarity between a corresponding sample image and the input image, from the plurality of sample media, based on the image information,
identify the setting information for each of the plurality of applications for each of the extracted predetermined number of sample media, and
collectively output the identified setting information for each of the plurality of applications.

2. The information processing apparatus according to claim 1, wherein
the processor receives the setting information and the sample image for each of the plurality of applications for the plurality of sample media from the image reading apparatus for setting via the communication device, and wherein
the processor sets image information related to the setting information and the sample image for each of the plurality of applications in the storage device.

3. The information processing apparatus according to claim 1, wherein
the storage device stores the setting information and the image information for each of the plurality of applications for the plurality of sample media, for each of a plurality of user IDs, wherein
the processor receives a user ID with the input image from the image reading apparatus, and wherein
the processor extracts the predetermined number of sample media from the sample media corresponding to the received user ID.

4. An image reading apparatus comprising:
a storage device to store, for a plurality of sample media, for each of a plurality of applications, setting information relating to imaging of a medium or an image processing, and image information relating to a sample image generated according to the setting information;
an imaging device to generate an input image by imaging a medium; and
a processor to
extract a predetermined number of sample media in a descending order of similarity between a corresponding sample image and the input image, from the plurality of sample media, based on the image information,
identify the setting information for each of the plurality of applications for each of the extracted predetermined number of sample media, and
collectively output information relating to the identified setting information for each of the plurality of applications.

5. The image reading apparatus according to claim 4, wherein the processor outputs an image in which the medium is imaged or the image processing is executed according to the identified setting information for each of the plurality of applications as the information relating to the setting information for each of the plurality of applications.

6. The image reading apparatus according to claim 4, wherein
the storage device stores the setting information and the image information for each of the plurality of applications for the plurality of sample media, for each of a plurality of user IDs, and wherein
the processor further acquires a user ID, and extracts the predetermined number of sample media from the sample media corresponding to the acquired user ID.

7. An image processing system comprising:
an information processing apparatus; and
an image reading apparatus, wherein
the information processing apparatus includes
a storage device to store, for a plurality of sample media, for each of a plurality of applications, setting information relating to imaging of a medium or an image processing, and image information relating to a sample image generated according to the setting information,
a first communication device, and
a first processor to
receive an input image from the image reading apparatus via the first communication device,
extract a predetermined number of sample media in a descending order of similarity between a corresponding sample image and the input image, from the plurality of sample media, based on the image information,
identify the setting information for each of the plurality of applications for each of the extracted predetermined number of sample media, and
transmit the identified setting information for each of the plurality of applications to the image reading apparatus via the first communication device, and wherein
the image reading apparatus includes
an imaging device to generate the input image by imaging a medium,
a second communication device, and
a second processor to
transmit the input image to the information processing apparatus via the second communication device,
receive the setting information for each of the plurality of applications from the information processing apparatus via the second communication device, and
collectively output information relating to the received setting information for each of the plurality of applications.

8. The image processing system according to claim 7, wherein the second processor outputs an image in which the medium is imaged or the image processing is executed according to the setting information for each of the plurality of applications received from the information processing apparatus, as the information relating to the setting information for each of the plurality of applications.

9. The image processing system according to claim 7, wherein
the storage device stores the setting information and the image information for each of the plurality of applications for the plurality of sample media, for each of a plurality of user IDs, wherein
the first processor receives a user ID with the input image from the image reading apparatus, and wherein
the first processor extracts the predetermined number of sample media from the sample media corresponding to the received user ID.

* * * * *